United States Patent
Takata et al.

(10) Patent No.: US 7,873,063 B2
(45) Date of Patent: Jan. 18, 2011

(54) CELL MANAGEMENT METHOD AND APPARATUS

(75) Inventors: Tatsuhiko Takata, Fukuoka (JP); Yohji Fukuzawa, Fukuoka (JP); Tsutomu Miyagaki, Fukuoka (JP); Syuhei Ohsako, Fukuoka (JP); Kousuke Sakamoto, Fukuoka (JP); Noriaki Taniguchi, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 570 days.

(21) Appl. No.: 11/822,198

(22) Filed: Jul. 3, 2007

(65) Prior Publication Data

US 2008/0004034 A1  Jan. 3, 2008

(30) Foreign Application Priority Data

Jul. 3, 2006  (JP) .............................. 2006-183783

(51) Int. Cl.
*H04L 12/28* (2006.01)
*H04L 12/56* (2006.01)

(52) U.S. Cl. ...................................... 370/419
(58) Field of Classification Search .................. 370/296
See application file for complete search history.

(56) References Cited

U.S. PATENT DOCUMENTS 7,414,990 B2 * 8/2008 Gilliland et al. ............. 370/329
2008/0043623 A1 * 2/2008 Franceschini et al. ....... 370/235

FOREIGN PATENT DOCUMENTS

JP  5-316039  11/1993
JP  2000-50340  2/2000

* cited by examiner

*Primary Examiner*—Daniel Wu
*Assistant Examiner*—Frederick Ott
(74) *Attorney, Agent, or Firm*—Hanify & King, P.C.

(57) ABSTRACT

In a cell management method and apparatus which can prevent a call loss generated in association with an increase of cell usage rate independent of a protection frequency bandwidth, cell usage rates of operating cells (at frequency Fo) are acquired. Narrower nonoperating cells (at frequency Fo) of the operating cell in which the cell usage rate indicates a high-load state are rendered an addition candidate and the operating cell is rendered a deletion candidate. A broader nonoperating cell (at frequency Fo) of the operating cell in which the cell usage rate indicates a low-load state is rendered an addition candidate, and the operating cell and other narrower operating cells belonging to the nonoperating cell are rendered deletion candidate. From among the nonoperating cells that are the addition candidate and the operating cells that are the deletion candidates, a nonoperating cell(s) to be switched over to an operating cell(s) and an operating cell(s) to be switched over to a nonoperating cell(s) is determined.

10 Claims, 21 Drawing Sheets

FIG.6A

| CELL ID | CELL USAGE RATE |
|---|---|
| 002 (CELL CL_002) | 90% |
| 003 (CELL CL_003) | 70% |
| ... | ... |
| 078 (CELL CL_078) | 5% |
| 079 (CELL CL_079) | 70% |
| 080 (CELL CL_080) | 1% |
| ... | ... |
| 088 (CELL CL_088) | 0% |
| 089 (CELL CL_089) | 10% |
| ... | ... |
| 250 (CELL CL_250) | 3% |
| ... | ... |

FIG.6B

| CELL ID | RNC NO. | BASE STATION NO. | SECTOR NO. | CELL OPERATING STATE | CELL USAGE RATE | NEIGHBORING RNC STATION NO. | CELL ID OF ADDITION CANDIDATE & DELETION CANDIDATE IN HIGH-LOAD STATE | CELL ID OF ADDITION CANDIDATE & DELETION CANDIDATE IN LOW-LOAD STATE |
|---|---|---|---|---|---|---|---|---|
| 001 (CELL CL_001) | 30_1 | 40_1 | 001 | NON-OPERATING | — | 30_2, 30_3 | ADDITION CANDIDATE: ID=003,008 DELETION CANDIDATE:ID=001 | ADDITION CANDIDATE:ID=002 DELETION CANDIDATE: ID=001,009,010 |
| 002 (CELL CL_002) | | | 002 | OPERATING | 60% → 90% | 30_2, 30_3 | ADDITION CANDIDATE: ID=001,009,010 DELETION CANDIDATE:ID=002 | ADDITION CANDIDATE:NONE DELETION CANDIDATE:NONE |
| 003 (CELL CL_003) | | | 003 | OPERATING | 40% → 70% | 30_2 | ADDITION CANDIDATE:NONE DELETION CANDIDATE:NONE | ADDITION CANDIDATE:ID=001 DELETION CANDIDATE: ID=003,008 |
| ... | | | ... | ... | ... | ... | ... | ... |
| 078 (CELL CL_078) | | | 078 | OPERATING | 7% → 5% | NONE | | |
| 079 (CELL CL_079) | | | 079 | OPERATING | 60% → 70% | NONE | | |
| 080 (CELL CL_080) | | | 080 | OPERATING | 20% → 1% | NONE | | |
| ... | | | ... | ... | ... | ... | | |
| 088 (CELL CL_088) | | 40_2 | 001 | OPERATING | 40% → 0% | NONE | ADDITION CANDIDATE: ID=090,099 DELETION CANDIDATE:ID=088 | ADDITION CANDIDATE:ID=200 DELETION CANDIDATE: ID=088,089,090 |
| 089 (CELL CL_089) | | | 002 | OPERATING | 30% → 10% | NONE | ADDITION CANDIDATE: ID=001,009,010 DELETION CANDIDATE:NONE | ADDITION CANDIDATE:ID=200 DELETION CANDIDATE: ID=088,089,090 |
| ... | | | ... | ... | ... | ... | ... | ... |
| 250 (CELL CL_250) | | 40_3 | 001 | OPERATING | 5% → 3% | NONE | ADDITION CANDIDATE: ID=260,261,262 DELETION CANDIDATE:ID=250 | ADDITION CANDIDATE:NONE DELETION CANDIDATE:NONE |
| ... | | | ... | ... | ... | ... | ... | ... |

BEFORE UPDATE / AFTER UPDATE

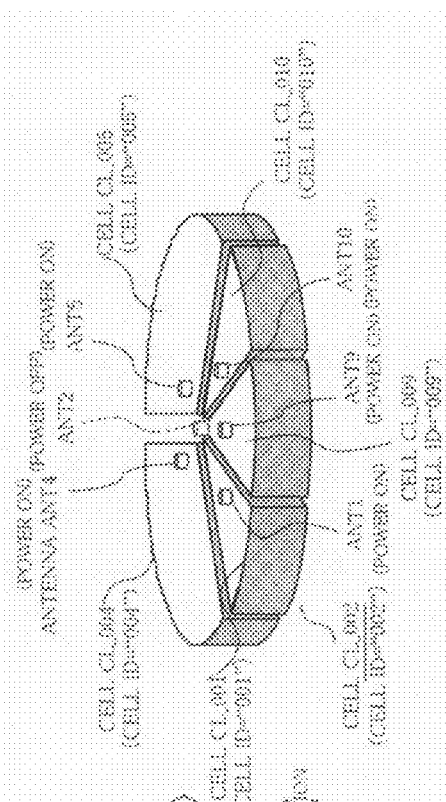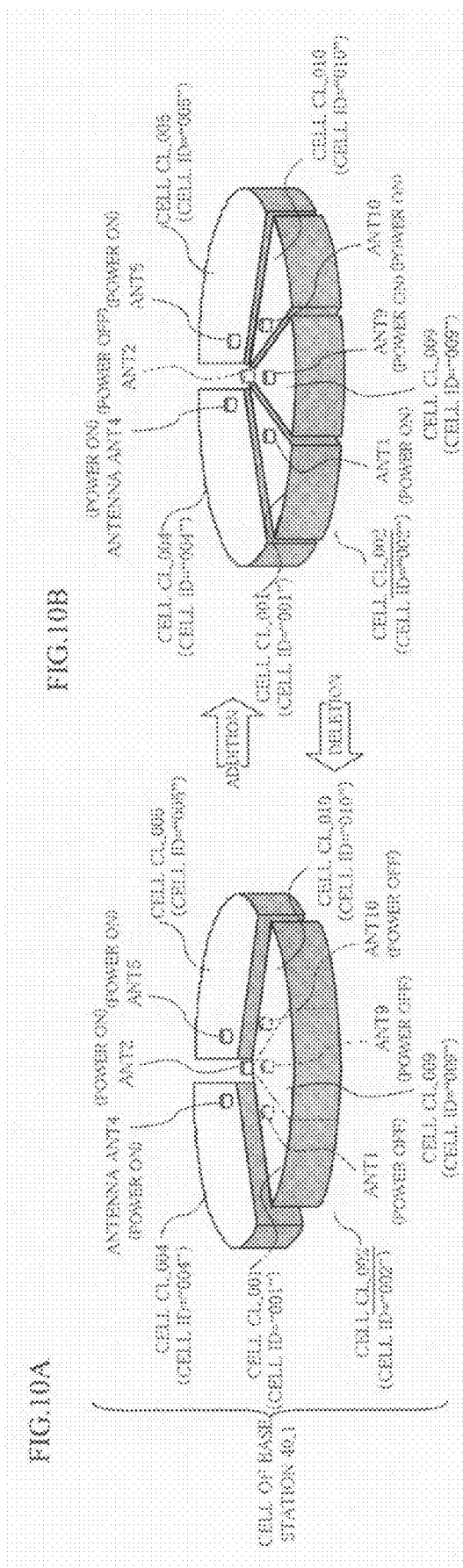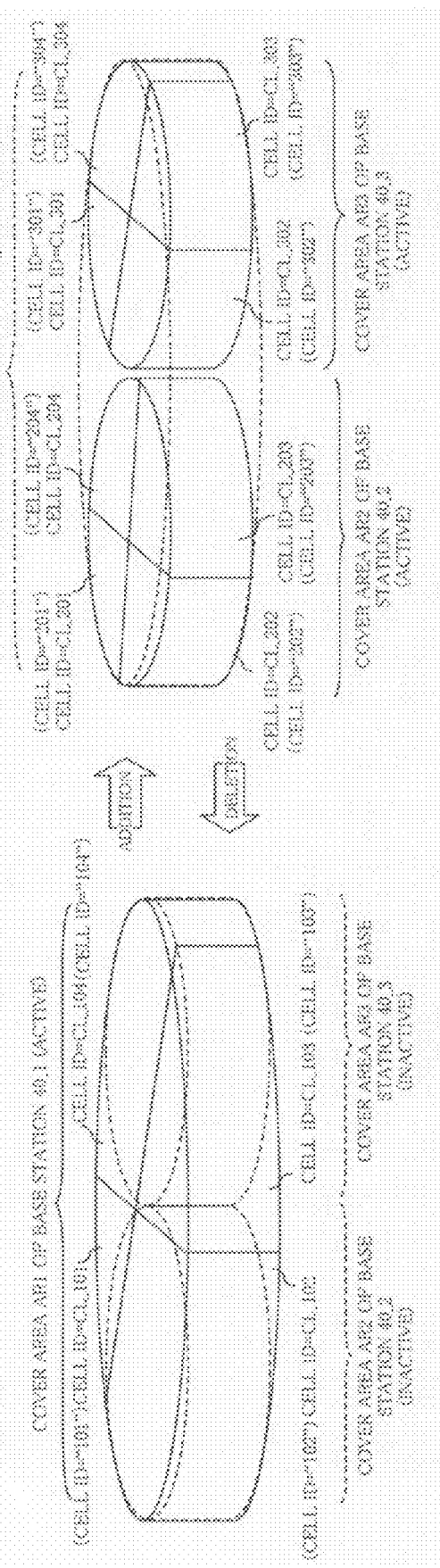
FIG. 10A
FIG. 10B
FIG. 10C
FIG. 10D

FIG.14

| CELL ID | RNC NO. | BASE STATION NO. | SECTOR NO. | ... | HISTORY OF OPERATION/NONOPERATION SWITCHOVER | FORECAST INFORMATION |
|---|---|---|---|---|---|---|
| 001 (CELL CL_002) | 30_1 | 40_1 | 001 | ... | ·2010/1/1 1:00 OPERATION SWITCHOVER<br>·2010/1/1 2:00 NONOPERATION SWITCHOVER | |
| 002 (CELL CL_002) | | | 002 | ... | ·2010/1/3 11:00 OPERATION SWITCHOVER<br>·2010/1/3 19:00 NONOPERATION SWITCHOVER<br>·2010/1/4 11:00 OPERATION SWITCHOVER<br>·2010/1/4 19:00 NONOPERATION SWITCHOVER<br>·2010/1/5 11:00 OPERATION SWITCHOVER<br>·2010/1/5 19:00 NONOPERATION SWITCHOVER | ·OPERATION SWITCHOVER REQUIRED EVERY DAY AT 10:00<br>·NONOPERATION SWITCHOVER ENABLED EVERY DAY AT 19:00 |
| ... | | | ... | ... | ... | ... |
| 088 (CELL CL_002) | | 40_2 | 001 | ... | ·2010/1/3 19:00 OPERATION SWITCHOVER<br>·2010/1/4 8:00 NONOPERATION SWITCHOVER<br>·2010/1/4 19:00 OPERATION SWITCHOVER<br>·2010/1/5 8:00 NONOPERATION SWITCHOVER | ·OPERATION SWITCHOVER REQUIRED EVERY DAY AT 19:00<br>·NONOPERATION SWITCHOVER ENABLED EVERY DAY AT 8:00 |
| ... | | | ... | ... | ... | ... |

| CELL ID | RNC NO. | BASE STATION NO. | SECTOR NO. | CELL OPERATING STATE | CELL USAGE RATE | ... | OPERATION PRIORITY |
|---|---|---|---|---|---|---|---|
| 001 (CELL CL_001) | 30_1 | 40_1 | 001 | NONOPERATING | — | ... | LOW PRIORITY |
| 002 (CELL CL_002) | | | 002 | OPERATING | 1% | ... | LOW PRIORITY |
| 003 (CELL CL_003) | | | 003 | OPERATING | 80% | ... | HIGH PRIORITY |
| ⋮ | | | ⋮ | ⋮ | ⋮ | ... | ⋮ |
| 088 (CELL CL_008) | | 40_2 | 001 | OPERATING | 3% | | HIGH PRIORITY |
| ⋮ | | | ⋮ | ⋮ | ⋮ | ... | ⋮ |

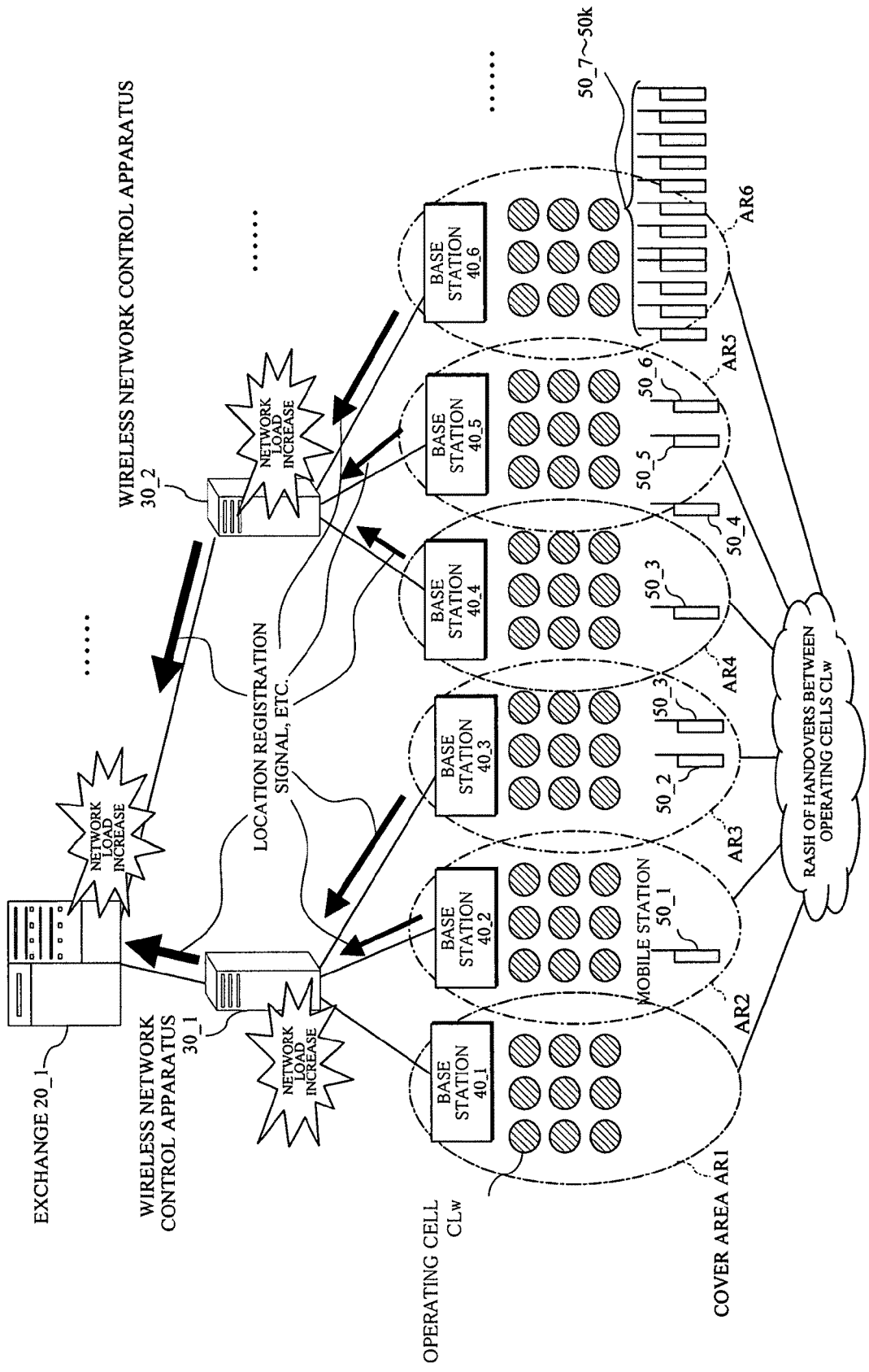

CELL MANAGEMENT METHOD AND APPARATUS

BACKGROUND OF THE INVENTION

1. Field of the Invention

The present invention relates to a cell management method and apparatus, and in particular to a cell management method and apparatus for switching a cell over to an operating/non-operating (active/inactive) state based on a cell usage rate and the like.

2. Description of the Related Art

Prior art examples of the above-mentioned cell management technology will now be described referring to FIGS. 18-21A, and 21B.

A wireless communication system 1 shown in FIG. 18 is composed of a core network 10, "1 (el)" units of exchanges 20_1-20__l (hereinafter, occasionally represented by a reference numeral 20) connected to the core network 10, "m" units of wireless network control apparatuses 30_1-30__m (hereinafter, occasionally represented by a reference numeral 30) connected to the exchange 20, and "n" units of base stations 40_1-40__n (hereinafter, occasionally represented by a reference numeral 40) managed by the wireless network control apparatuses 30.

The communication of voice data and packet data in the wireless communication system 1 is performed, as shown in FIG. 19. Each of mobile stations 50_1-50__k (hereinafter, occasionally represented by a reference numeral 50), which exists within cover areas AR1-ARn (hereinafter, occasionally represented by reference characters AR) where the base stations 40_1-40__n can respectively provide services, connects a call to the wireless network control apparatus 30 through the base station 40 of the cover area AR where the mobile station itself exists.

Also, as shown in FIG. 19, a plurality of cells CL divided according to a frequency and a directivity to be assigned are allocated within the cover area AR for an effective use of the area. Accordingly, more mobile stations 50 are allowed to connect their calls within a single cover area AR.

However, the number of mobile stations capable of connecting a call per cell CL is limited, and the number of cells CL (hereinafter, referred to as upper limit number of operating cells) that can be made an operating state for the entire system is also limited, so that an operator presets cells CL to be respectively made an operating state and a nonoperating state (hereinafter, respectively referred to as operating cell CLw and nonoperating cell CLp) according to a regionality (e.g. user number density) and the like of the cover area AR at the time of network configuration.

Thereafter, at the time of network operation, the operator carries out a reappraisal of the operating cell CLw and the nonoperating cell CLp according to a transition of communication traffic and the like, and switches between an operating and a nonoperating state thereof as appropriate.

In such a network operation, problems of a call loss occurrence and a network load increase may arise.

Example of Call Loss Occurrence: FIG. 19

It is now assumed that two operating cells CLw, for example, are set as shown hatched in the cover area AR6 of the base station 40_6 shown in FIG. 19.

Within this cover area AR6, when the mobile stations 50_7-50__k ("k" is a number sufficiently larger than the limited number of mobile stations capable of connecting a call per cell CL) request call connections at the same time, cell usage rates of these operating cells CLw increase so that the number of mobile stations exceeds the limited number. Accordingly, some of the mobile stations cannot make the call connections to the wireless network control apparatus 30_2, thereby generating a call loss as shown in FIG. 19.

Example of Network Load Increase: FIG. 20

The above-mentioned call loss occurrence can be prevented if the operator presets all of the cells CL within the cover area AR as the operating cells CLw.

However, an increase in a density of operating cells within the cover area AR leads to a rash of handovers associated with moves of the mobile stations 50 between the operating cells CLw, so that an increase in communication traffic by location registration signals and the like causes a network load increase for the exchanges 20 and the wireless network control apparatuses 30. Also, the installation of the exchanges 20 and the wireless network control apparatuses 30 resistant to the network load increase leads to an increase in development cost and operation cost.

In order to deal with these problems, a cell management technology described below has been proposed.

Prior Art Cell Management Example: FIGS. 21A and 21B

FIG. 21A shows a part of the wireless network control apparatus 30_1 as well as the base stations 40_1 and 40_2 extracted from the arrangement of the wireless communication system 1 shown in FIG. 18.

In the cover areas AR1 and AR2 of the base stations 40_1 and 40_2, operating cells CLw_001-CLw_019 and CLw_020-CLw_038 divided according to directivities are respectively set. Also, as the operating cells CLw_001-CLw_003 are exemplified in FIG. 21B, a frequency Fo as a working frequency is allocated to the operating cells CLw_001-CLw_003. Nonoperating cells CLp_101-CLp_103 and CLp_201-CLp_203 having the same directivity as that of the operating cells CLw_001-CLw_003 while having protection frequencies $F_1$ and $F_2$ different from the working frequency Fo are respectively allocated thereto are set.

In operation, the wireless network control apparatus 30_1 controls the network by using the operating cells CLw_001-CLw_003, while on the other hand monitoring the cell usage rates of the operating cells CLw_001-CLw_003, and additionally using, when the cell usage rates exceed a preset upper limit value (hereinafter, referred to as high-load state), the nonoperating cells CLp_101-CLp_103 and CLp_201-CLp_203 by switching them over to the operating state. Also, when the cell usage rates of the nonoperating cells CLp_101-CLp_103 and CLp_201-CLp_203 that have been made the operating state decrease below a preset lower limit value (hereinafter, referred to as low-load state), the wireless network apparatus 30_1 stops using the nonoperating cells CLp_101-CLp_103 and CLp_201-CLp_203 and switches them over again to the nonoperating state.

Thus, by using cells CL to which the protection frequencies are allocated, it is made possible to prevent the above-mentioned call loss occurrence without unnecessarily increasing the network load (see e.g. patent document 1).

It is to be noted that, as a reference example, there is a technology that reduces a coverage of signals communicated between the base stations 40 and the mobile stations 50 (namely, reduces the number of mobile stations existing within the operating cells CLw), thereby decreasing the cell usage rate to maintain the communication quality at a fixed level (see e.g. patent document 2).

Although this reference example can maintain the communication quality at a fixed level, the number of mobile stations capable of making call connections in the operating cells CLw is further limited when the cell usage rates are increased. Therefore, the above-mentioned call loss occurrence cannot be prevented.

[Patent document 1] Japanese Patent Application Laid-open No. 5-316039

[Patent document 2] Japanese Patent Application Laid-open No. 2000-50340

In the above-mentioned prior art example, while the call loss occurrence can be prevented by using a protection frequency bandwidth, protection frequencies cannot always be allocated thereto since limitations exist for a frequency bandwidth available in a wireless communication system (for example, a limitation by a distribution of frequency bandwidths among enterprises operating similar wireless communication systems and a limitation by frequency bandwidths used by other communication apparatuses, systems, and the like). Accordingly, in the above-mentioned prior art example, there is a problem that in the presence of a limitation for available frequency bandwidths, the call loss may be generated by failing to secure the number of operating cells for the mobile stations requesting call connections when the cell usage rates are increased without being able to prepare sufficient nonoperating cells to which protection frequency bandwidths are allocated.

SUMMARY OF THE INVENTION

It is accordingly an object of the present invention to provide a cell management method and apparatus capable of preventing a call loss generated in association with an increase in cell usage rates, independent of protection frequency bandwidths.

[1] In order to achieve the above-mentioned object, a cell management method (or apparatus) according to one aspect of the present invention comprises: a first step of (or means) acquiring a cell usage rate of one or more operating cells; a second step of (or means) rendering, when the cell usage rate acquired indicates a high-load state, narrower nonoperating cells of the operating cell in the high-load state to which a common frequency is allocated an addition candidate and the operating cell in the high-load state a deletion candidate, and rendering, when the acquired cell usage rate indicates a low-load state, a broader nonoperating cell of the operating cell in the low-load state to which a common frequency is allocated an addition candidate, another narrower operating cell belonging to the broader nonoperating cell a deletion candidate, and the operating cell in the low-load state a deletion candidate; and a third step of (or means) determining, from among the nonoperating cells of the addition candidate and the operating cell of the deletion candidate, a nonoperating cell to be switched over to an operating cell and an operating cell to be switched over to a nonoperating cell, within an upper limit number of operating cells.

The cell management method (or apparatus) according to one aspect of the present invention will be described using a cell arrangement schematically shown in FIG. 1, where the present invention is not limited to this aspect.

A common frequency $F_0$ is allocated to all of the cells CL shown in FIG. 1, regardless of whether it is set to an operating cell CLw or a nonoperating cell CLp. Also, a broader (parent) cell denotes a single cell to which directivities of a plurality of cells CL are collectively allocated, while a narrower (child) cell denotes a cell (namely, each of the of cells) compensating for a part of the directivities of the broader cell.

It is to be noted that the broader cell and the narrower cell can be individually switched over between an operating and nonoperating states. Namely, for example, it is possible to set only the broader cell in the operating state while setting the narrower cell in the nonoperating state, or contrarily set the broader cell and the narrower cell respectively in the nonoperating state and the operating state. However, in the present invention, it is supposed that the broader cell and the narrower cell are not concurrently set in the operating state or the nonoperating state.

Firstly, at the first step (or means), cell usage rates of operating cells CLw_001, CLw_021, CLw_022, CLw_023, and CLw_003 set in an operating state are respectively acquired.

At the second step (or means), narrower nonoperating cells CLp_011 and CLp_012 of the operating cell CLw_001 in which the cell usage rate acquired indicates the high-load state are rendered an addition candidate and the operating cell CLw_001 is rendered the deletion candidate.

Also, at the second step (or means), nonoperating broader cell CLp_002 of the operating cell CLw_021 in which the cell usage rate indicates the low-load state is rendered the addition candidate, other narrower operating cells CLw_022 and CLw_023 belonging to the nonoperating cell CLp_002 are rendered the deletion candidate, and the operating cell CLw_021 is rendered the deletion candidate.

Also, at the second step (or means), nothing is done for the operating cells CLw_022, CLw_023, and CLw_003 in which the cell usage rates indicate neither the high-load state nor the low-load state.

At the third step (or means), from among the nonoperating cells CLp_011, CLp_012, and CLp_002 of the addition candidate as well as the operating cells CLw_001, and CLw_021-CLw_023 of the deletion candidate, a nonoperating cell to be switched over to an operating cell and an operating cell to be switched over to a nonoperating cell are determined within the upper limit number of operating cells.

For example, when the cells CLp_011 and CLp_012 are determined as the nonoperating cells to be switched over to the operating cell, and the cell CLw_001 is determined as the operating cell to be switched over to the nonoperating cell, the two nonoperating cells CLp_011 and CLp_012 compensating for the directivity of the operating cell CLw_001 can be rendered the operating cells, so that it is made possible to double the number of mobile stations capable of making call connections while maintaining the directivity of the original operating cell.

Also, when the cell CLp_002 is determined as the nonoperating cell to be switched over to the operating cell, and the cells CLw_021-CLw_023 are determined as the operating cells to be switched over to the nonoperating cells, a single nonoperating cell CLp_002 to which the directivities of the operating cells CLw_021-CLw_023 are collectively allocated can be made the operating cell, so that it is made possible to delete operating cells in which the cell usage rate is low and are not required to be set to the operating state while maintaining the directivities of the original operating cells. Therefore, the above-mentioned increase in density of the operating cells within the cover area AR can be avoided and the network load associated with the handovers or the like of the mobile stations can be reduced.

It is to be noted that the above-mentioned second and third steps (or means) compose the step of (or means for) "addition/deletion target cell determination".

Thus, in the cell management method and apparatus according to one aspect of the present invention, it is made possible to prevent a call loss generated in association with the increase of the cell rate, independent of protection frequency bandwidths.

[2] Also, in the above mentioned [1], the third step (or means) may include, a step of (or means) determining, from among the operating cells included in the deletion candidate and in the high-load state, an operating cell in which the cell usage rate is higher to be preferentially switched over to a nonoperating cell, and subsequently determining a narrower nonoperating cell to be switched over to an operating cell, and a step of (or means) determining, from among the operating cells included in the deletion candidate and in the high-load state, when a sum of an increased number of operating cells by the operating cells and the nonoperating cells determined and a number of operating cells before the determination exceeds the upper limit number of operating cells, an operating cell in which the cell usage rate is lower to be preferentially switched over to a nonoperating cell, and subsequently determining a broader nonoperating cell to be switched over to an operating cell and another narrower operating cell belonging to the broader nonoperating cell to be switched over to a nonoperating cell so that the upper limit number of operating cells is not exceeded.

Namely, in the presence of a plurality of the nonoperating cells CLp rendered the addition candidate and a plurality of the operating cells CLw rendered the deletion candidate, at the third step (or means) the operating cell included in the deletion candidate and in the high-load state in which the cell usage rate is higher (namely, in which the call loss may occur faster) is determined as the operating cells to be preferentially switched over to the nonoperating cell, and the narrower nonoperating cells of the operating cell determined are determined as the nonoperating cells to be switched over to the operating cells.

When the sum of the increased number of operating cells due to this determination and the number of operating cells before the determination exceeds the upper limit number of operating cells (namely, when the switchover of the operating/nonoperating states with respect to the operating cells indicating the high-load state and the narrower nonoperating cells thereof cannot be executed any more), at the third step (or means), the operating cell included in the deletion candidate and in the low-load state in which the cell usage rate is lower (namely, which is less required to be set in the operating state) is determined as the operating cells to be preferentially switched over to the nonoperating cell, and the broader nonoperating cells of the operating cell determined are determined as the nonoperating cells to be switched over to the operating cells, and the other operating cells belonging to the broader nonoperating cell are determined as the operating cells to be switched over to the nonoperating cells so as not to exceed the upper limit number of operating cells.

Namely, the number of operating cells to be switched over to the nonoperating cells is increased so as not to exceed the upper limit number of operating cells.

Thus, the operating/nonoperating state of cells can be optimally switched over according to the state of the cell usage rate.

[3] Also, in the above mentioned [1], the third step (or means) may include a fourth step of (or means) updating a history of each cell, and determining a nonoperating cell as an addition candidate and an operating cell as a deletion candidate forecast based on the updated history, regardless of the cell usage rate.

Namely, at the fourth step, by using e.g. a variety of statistics for the history of the cells, a candidate of the nonoperating cell CLp required to be added and a candidate of the operating cell CLw which can be deleted are determined by a forecast regardless of the cell usage rate (namely, before the cell usage rate reaches the high-load state or the low-load state).

In this case, it is made possible to more effectively prevent the call loss occurrence associated with the increase in cell usage rate.

[4] Also, in the above-mentioned [3], the fourth step (or means) may include updating a date and time, as the history, when the nonoperating cell to be switched over to the operating cell and the operating cell to be switched over to the nonoperating cell are determined, and forecasting, when a switchover from a same cell to an operating cell or a nonoperating cell is recorded at a same time for predetermined days or more, the cell as a periodic addition candidate or deletion candidate at the time.

[5] Also, in the above mentioned [1], an operation priority may be assigned to every cell, and the third step (or means) may include a step of (or means) determining from among the operating cells included in the deletion candidate and in the high-load state, an operating cell in which the operation priority is higher to be preferentially switched over to a nonoperating cell, and subsequently determining a narrower nonoperating cell to be switched over to an operating cell, and a step of (or means) determining from among the operating cells included in the deletion candidate and in the high-load state, when a sum of an increased number of operating cells by the determined operating cells and the nonoperating cells and a number of operating cells before the determination exceeds the upper limit number of operating cells, an operating cell in which the operation priority rate is lower to be preferentially switched over to a nonoperating cell, and subsequently determining a broader nonoperating cell thereof to be switched over to an operating cell and another narrower operating cell belonging to the broader nonoperating cell to be switched over to a nonoperating cell so that the upper limit number of operating cells is not exceeded.

Namely, in the presence of a plurality of the nonoperating cells CLp rendered the addition candidate and a plurality of the operating cells CLw rendered the deletion candidate as in the case of the above-mentioned [2], and when the operating priority is added to the cells, at the third step (or means) the cells can be optimally switched over to the operating/nonoperating state according to the operating priority.

According to the present invention, it is made possible to prevent the call loss generatedion in association with the increase of the cell usage rate independent of a protection frequency bandwidth, thereby improving reliability and communication quality of a wireless communication system to which the present invention is applied.

Also, since the nonoperating cell as an addition candidate and the operating cell as a deletion candidate forecast are determined based on a history of each of the cells, it is made possible to more effectively prevent the call loss occurrence.

Moreover, since the operating/nonoperating state of a cell is switched over in accordance with the state of the cell usage rate or the operation priority of the cell, it is made possible to optimally perform network operations under various characteristic environments.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 6A and 6B are diagrams showing embodiments of a cell usage rate notification and a cell usage rate management table used for the present invention;

FIGS. 10A-10D are diagrams showing cell addition/deletion examples of a base station used for the present invention;

FIG. 14 is a diagram showing an embodiment of a cell usage rate management table used for an embodiment [2] of a cell management method and apparatus according to the present invention;

FIG. 20 is a block diagram showing an example of a conventional network load increase.

DESCRIPTION OF THE EMBODIMENTS

Hereinafter, embodiments [1]-[3] of the above-mentioned cell management method and an apparatus using the same according to the present invention will be described referring to FIGS. 2, 3A, 3B, 4, 5, 6A, 6B, 7-9, 10A-10D, 11A, 11B, 12-16, 17A, and 17B.

I. Arrangement and Operation Common to Embodiments: FIGS. 2, 3A, 3B, 4, 5, 6A, 6B, 7-9, and 10A-10D Firstly, an arrangement and operation common to the embodiments will be described.

Figure 2:
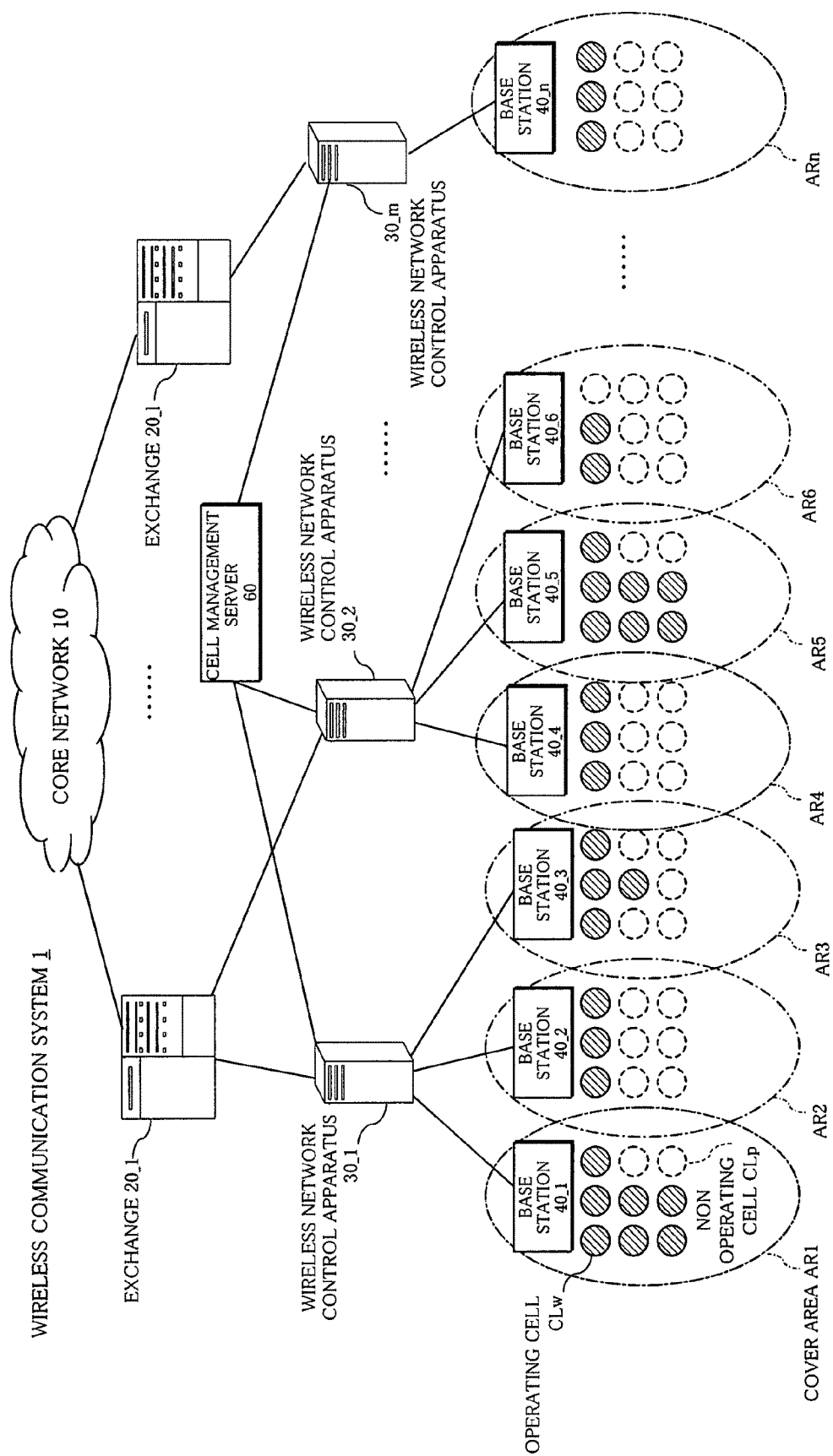
FIG. 2 is a block diagram showing an arrangement of a wireless communication system common to embodiments of a cell management method and apparatus according to the present invention.
Figure 3A:
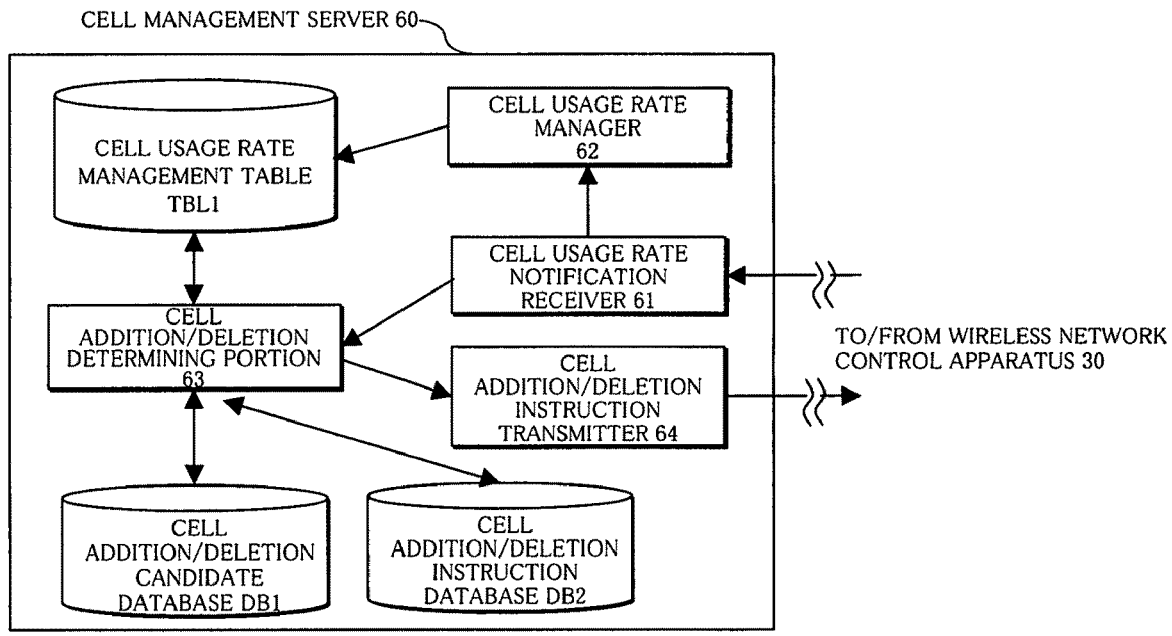
FIGS. 3A and 3B are diagrams showing arrangements of a cell management server and a wireless network control apparatus common to embodiments of a cell management method and apparatus according to the present invention.
Figure 3B:
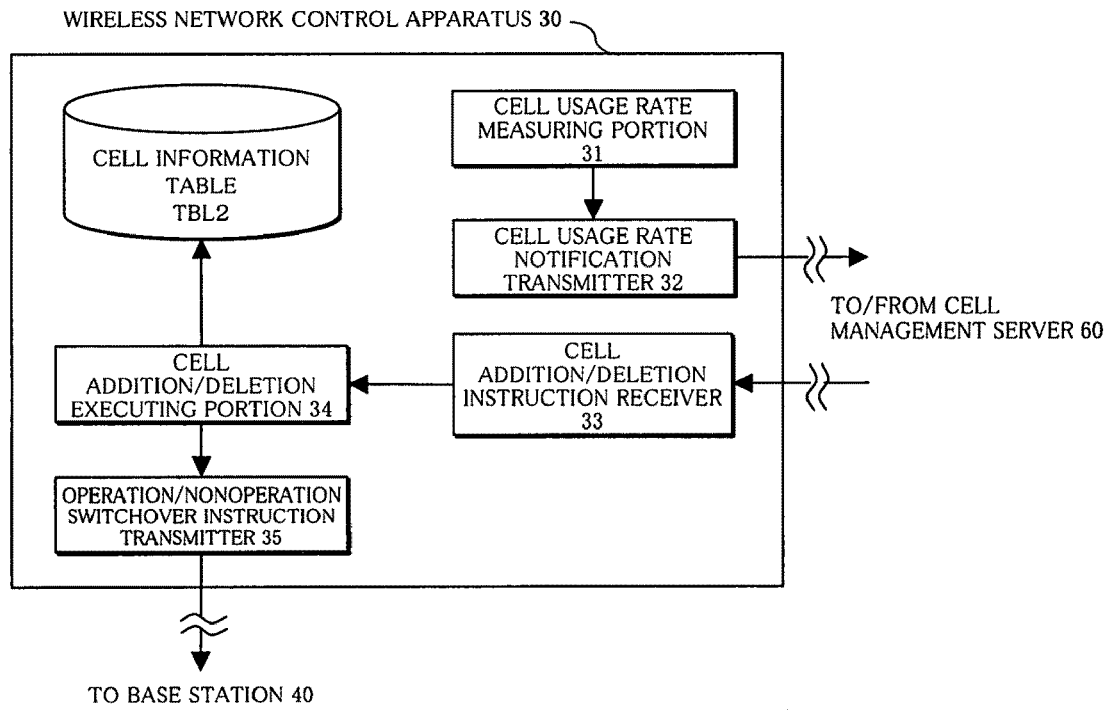

I.1 Arrangement Common to Embodiments: FIGS. 2, 3A, and 3B

A wireless communication system 1 shown in FIG. 2 is composed of a core network 10, "l" units of exchanges 20_1-20_l connected to the core network 10, "m" units of wireless network control apparatuses 30_1-30_m connected to the exchange 20, "n" units of base stations 40_1-40_n managed by the wireless network control apparatuses 30, a cell management server 60 commonly connected to the wireless network control apparatuses 30_1-30_m.

Also, as shown in FIG. 2, a plurality of cells CL to which a common frequency is allocated and divided according to directivities are assigned within cover areas AR1-ARn where each of the base stations 40_1-40_n can provide services, each of the cells CL being preset to either of an operating cell CLw or a nonoperating cell CLp.

Also, the cell management server 60 and the wireless network control apparatus 30 are respectively composed as follows:

I.1.A. Arrangement of Cell Management Server 60: FIG. 3A

The cell management server 60 is, as shown in FIG. 3A, provided with a cell usage rate notification receiver 61 receiving a cell usage rate notification indicating a cell usage rate per operating cell CLw from the wireless network control apparatus 30, a cell usage rate manager 62 writing the received cell usage rate in a cell usage rate management table TBL1, a cell addition/deletion determining portion 63 extracting a nonoperating cell CLp to be rendered an addition candidate and an operating cell CLw to be rendered a deletion candidate from the table TBL1 to be registered in a cell addition/deletion candidate database DB1 and determining a cell CL to be switched over between the operating and the nonoperating states from the database DB1 and within an upper limit number of operating cells to be registered in a cell addition/deletion instruction database DB2, and a cell addition/deletion instruction transmitter 64 transmitting the cell addition/deletion instructions outputted from the cell addition/deletion determining portion 63 to the wireless network control apparatus 30.

I.1.B. Arrangement of Wireless Network Control Apparatus 30: FIG. 3B

The wireless network control apparatus 30 is, as shown in FIG. 3B, provided with a cell usage rate measuring portion 31 measuring the cell usage rate per operating cell CLw, a cell usage rate notification transmitter 32 transmitting a cell usage rate notification including all the cell usage rates measured to the cell management server 60, a cell addition/deletion instruction receiver 33 receiving the cell addition/deletion instructions from the cell management server 60, a cell addition/deletion executing portion 34 outputting an operation/nonoperation switchover instructions of a corresponding cell CL according to the cell addition/deletion instructions received and adding to the cell information table TBL2 or deleting from the table TBL2 cell information in the cell CL, and an operation/nonoperation switchover instruction transmitter 35 transmitting the operation/nonoperation switchover instructions outputted from the cell addition/deletion executing portion 34.

I.2. Operation Example Common to Embodiments: FIGS. 4, 5, 6A, 6B, 7-9, and 10A-10D An operation common to the embodiments will now be described, wherein an operation of acquiring cell usage rates will be firstly described referring to FIGS. 4, 5, and 6A, 6B. Thereafter, an operation of cell addition/deletion based on the cell usage rate acquired will be described referring to FIGS. 7-9, and 10A-10D.

I.2.A. Operation Example of Acquiring Cell Usage Rates: FIGS. 4, 5, 6A, and 6B

Figure 4:
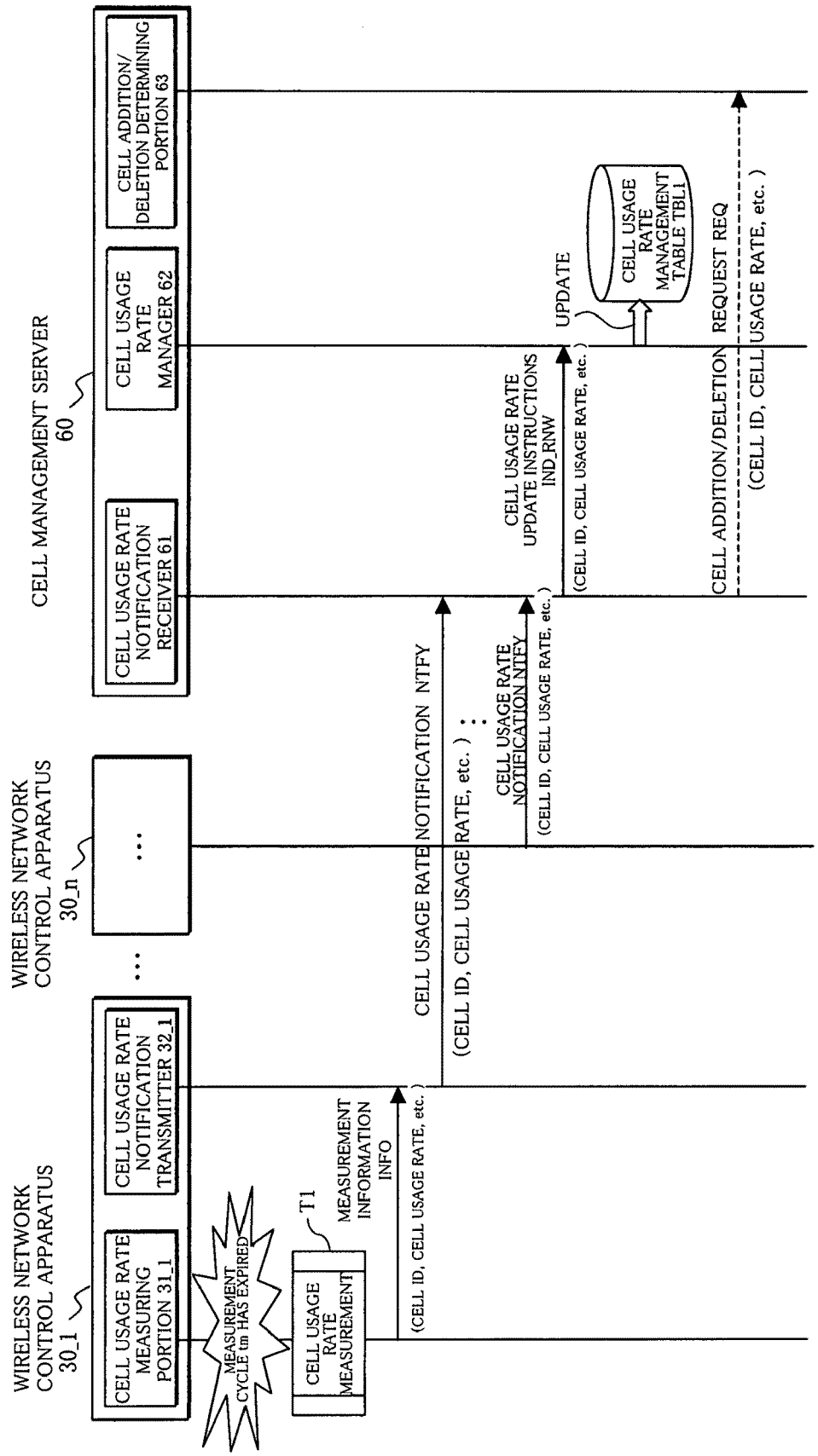
FIG. 4 is a sequence diagram showing a cell usage rate acquiring operation common to embodiments of a cell management method and apparatus according to the present invention.

FIG. 4 is a sequence diagram showing an overall operation of acquiring cell usage rates by the cell management server 60 and the wireless network control apparatus 30 shown in FIGS. 3A and 3B.

Taking the wireless network control apparatus 30_1 as an example, a cell usage rate measuring portion 31_1 in the wireless network control apparatus 30_1 measures, when a measurement cycle "tm" (arbitrary cycle) has expired, the cell usage rate per operating cell CLw set within the cover areas AR1-AR3 of the base stations 40_1-40_3 shown in FIG. 2 by executing a cell usage rate measurement (at step T1) which will be described later, and provides the measurement information INFO (cell ID, cell usage rate, etc.) to a cell usage rate notification transmitter 32_1.

The cell ID is an identifier for uniquely identifying each cell CL within the wireless communication system 1. The cell usage rate is, for example, a proportion of the number of mobile stations during a call connection over a limited number of mobile stations capable of performing a call connection per cell CL.

The cell usage rate notification transmitter 32_1 having received the measurement information INFO generates a cell usage rate notification NTFY to be transmitted to the cell management server 60.

Also, the wireless network control apparatuses 30_2-30_m, in the same way as mentioned above, measure the cell usage rate per operating cell CLw set within the cover areas AR4-ARn, and transmit the cell usage rate notification NTFY to the cell management server 60.

The cell usage rate notification receiver 61 within the cell management server 60 having received the cell usage rate notification NFTY from each of the wireless network apparatuses 30_1-30_m provides the cell usage rate manager 62 with the cell usage rate update instructions IND_RNW so as to update the cell usage rate management table TBL1.

The cell usage rate manager 62 having received the cell usage rate update instructions IND_RNW updates the corresponding cell usage rate in the cell usage rate management table TBL1.

It is to be noted that while in this embodiment, the cell addition/deletion determining portion 63 is described as periodically referring to the updated cell usage rate management table TBL1 to perform a cell addition/deletion operation, it is possible to make the cell usage rate notification receiver 61 having received the cell usage rate notification NTFY promote the cell addition/deletion by directly providing a cell addition/deletion request REQ to the cell addition/deletion determining portion 63 as shown by the dotted line in FIG. 4.

Hereinafter, a cell usage rate measurement example of the cell usage rate measuring portion 31, an embodiment of the cell usage rate notification NTFY, and an embodiment of the cell usage rate management table TBL1 will be described referring to FIGS. 5, 6A and 6B.

I.2.A.a. Cell Usage Rate Measurement Example: FIG. 5

Figure 5:
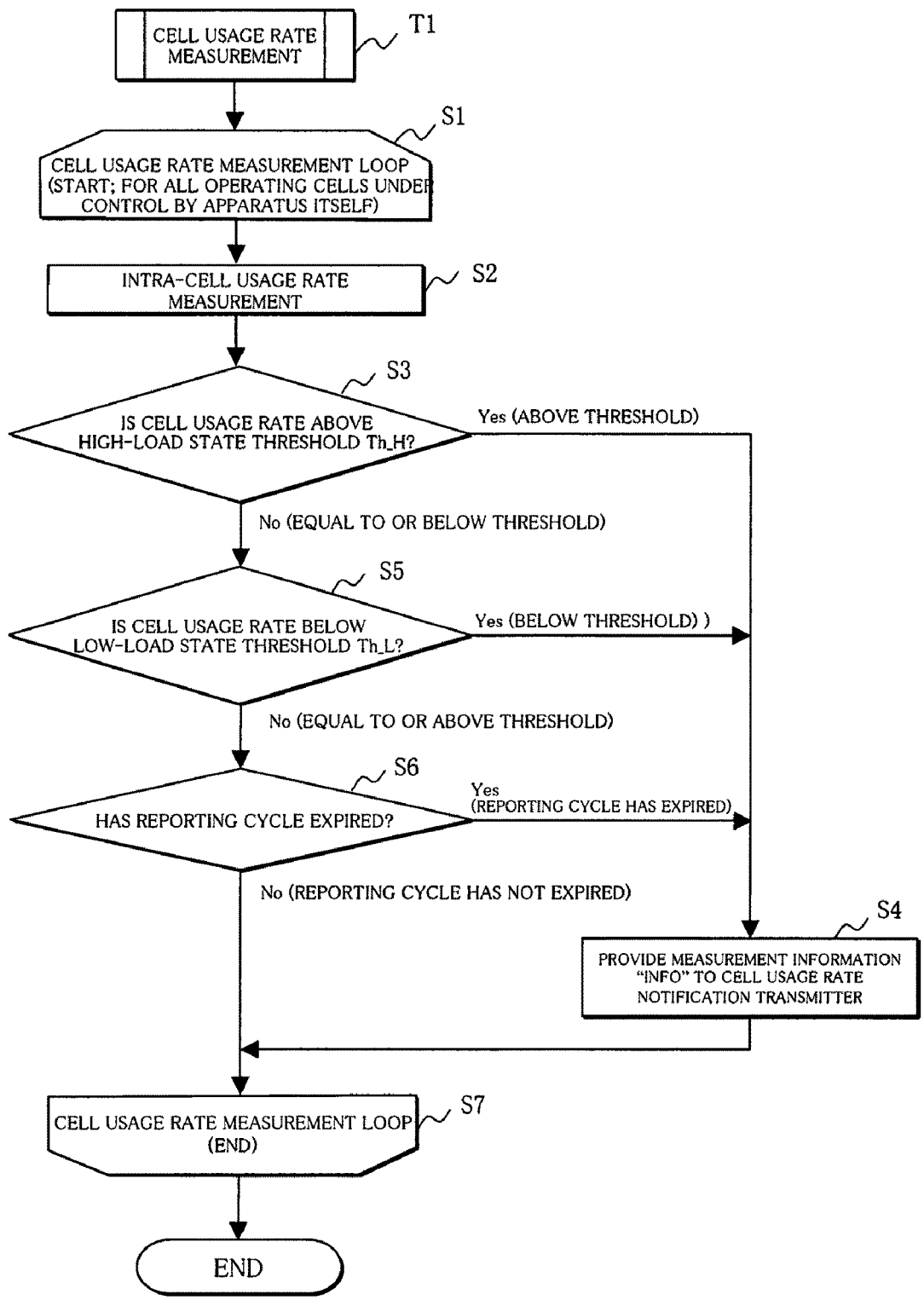
FIG. 5 is a flowchart showing an operation example of a cell usage rate measuring portion used for the present invention.

FIG. 5 is a flowchart showing an operation of the cell usage rate measuring portion 31.

The cell usage rate measuring portion 31 sequentially measures all of the operating cells CLw under the control of the portion 31 itself (at step S1). When it is determined that a measured cell usage rate of an operating cell CLw is above (exceeds) a high-load state threshold Th_H (at steps S2 and S3), the cell usage rate measuring portion 31 provides the cell usage rate notification transmitter 32 with the measurement information INFO (at step S4).

Also, upon determining that the measured cell usage rate is reduced below a low-load state threshold Th_L (at step S5), the cell usage rate measuring portion 31 likewise provides the cell usage rate notification transmitter 32 with the measurement information INFO (at step S4).

It is to be noted that the cell usage rate notification transmitter 32 is provided with only the measurement information INFO of the operating cells CLw when the cell usage rates are above the high-load state threshold Th_H or below the low-load state threshold Th_L so as not to unnecessarily increase the amount of communication traffic by communicating the cell usage rate notification NTFY of the operating cells CLw other than those related to the cell addition/deletion between the wireless network control apparatus 30 and the cell management server 60.

Also, when a report cycle "tr" (arbitrary cycle) requiring the cell usage rates to be reported to the cell management server 60 has expired (at step S6), the cell usage rate measuring portion 31 provides the cell usage rate notification transmitter 32 with the measured information regardless of the state of the cell usage rate measured (at step S4). In this case, since the cell usage rate notification NTFY is periodically transmitted to the cell management server 60, the cell management server 60 can always be aware of the latest cell usage rates.

Upon completion of measuring the cell usage rates of all the operating cells CLw under the control of the apparatus 30 itself, the cell usage rate measuring portion 31 ends the process (at step S7).

I.2.A.b. Embodiment of Cell Usage Rate Notification: FIG. 6A

The cell usage rate notification NTFY has the cell ID and the cell usage rate per operating cell CLw respectively set therein as shown in FIG. 6A. For example, the cell usage rate of the cell CL_002 (see FIG. 1) in which the cell ID is "002" is currently "90%" which indicates the high-load state.

I.2.A.c. Embodiment of Cell Usage Rate Management Table: FIG. 6B

In the cell usage rate management table TBL1, besides the cells ID and the cell usage rate corresponding thereto, a wireless network control apparatus No. (RNC No.), a base station No., a sector No. for uniquely identifying the directivity of each of the cells CL within the cover area AR, an operating state (operating/nonoperating) of each of the cells CL, a neighboring wireless network control apparatus No. (neighboring RNC No.), cell ID's of the cells CL rendered a cell addition candidate and a cell deletion candidate when the cell usage rate is in the high-load state as well as a cell addition candidate and a cell deletion candidate when the cell usage rate is in the low-load state, as shown in FIG. 6B.

Taking the cell CL_002 as an example, the cell CL_002 is indicated as a cell in which the sector No. is "002" within the cover area (AR1) under the control of the base stations 40_1 connected to the wireless network control apparatus 30_1 and is currently set to operating state. Also, the wireless network control apparatuses 30_2 and 30_3 set as the neighboring RNC No. indicate that they must be notified when the operating/nonoperating state of the cell CL_002 is switched over. This is because the cell CL_002 and any cell CL controlled by the wireless network control apparatuses 30_2 and 30_3 are adjoining (adjoining cells), so that for example, when the mobile stations 40 moves between the adjoining cells and handovers are generated, each of the wireless network control apparatuses 30_1-30_3 must be aware of the operating state of the cell CL_002.

It is to be noted that the cell CL in which the RNC No. is set to "none" is indicated as not being adjoining to the cells controlled by the other wireless network control apparatuses, so that the operation/nonoperation switchover of the cell CL need not be notified.

Figure 1:
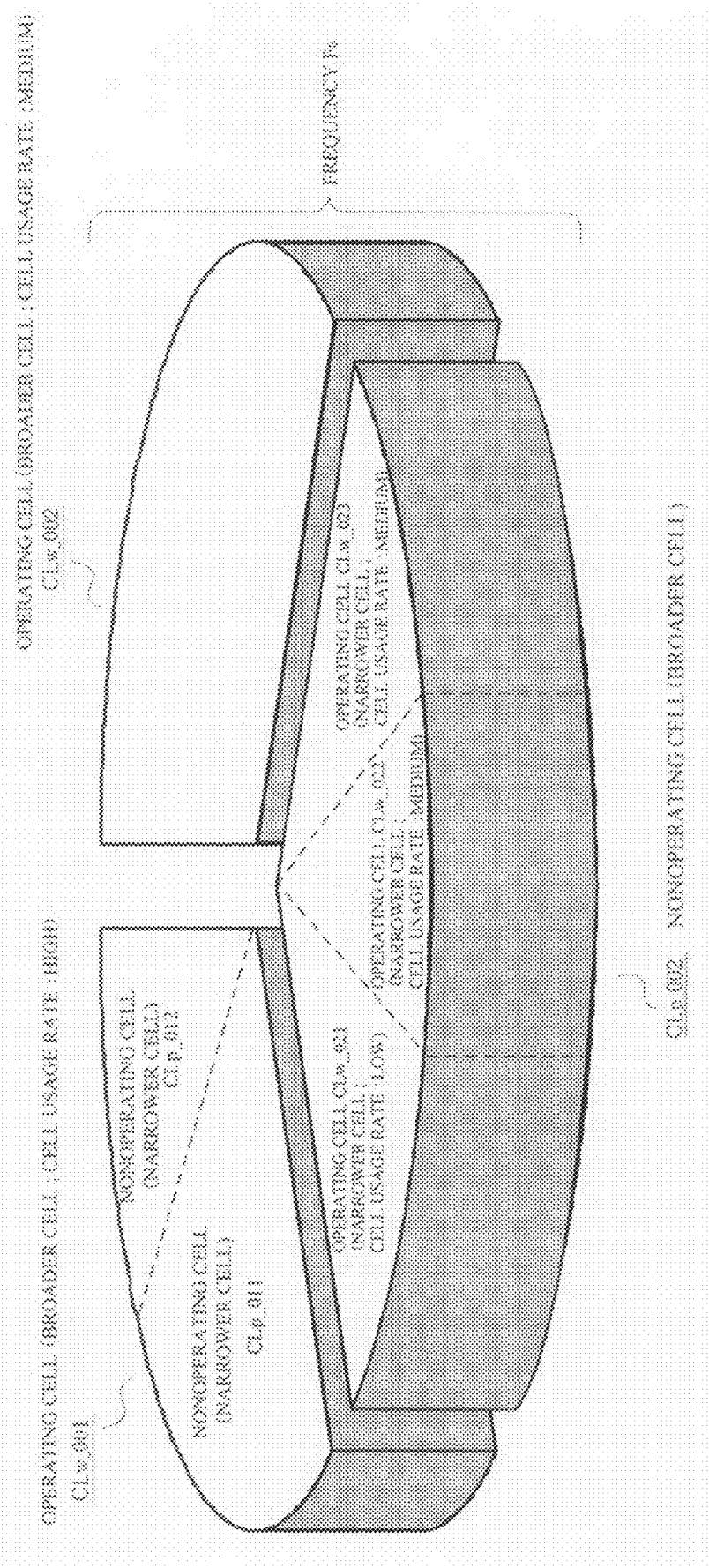
FIG. 1 is a schematic diagram of a cell management method and apparatus according to the present invention.

Also, the cell ID's "001", "009", and "010" of the cells rendered the addition candidate and the cell ID "002" of the cell rendered the deletion candidate when the cell usage rate is in the high-load state indicate, as shown in FIG. 1, that the cell CL_002 is the broader cell and the cells CL_001, CL_009, and CL_010 are the narrower cells belonging to the cell CL_002, while the cell ID "none" of the cells rendered the addition candidate and the cell ID "none" of the cell rendered the deletion candidate when the cell usage rate is in the low-load state indicate that the cell CL_002 is the broadest cell (namely the cell CL_002 has no broader cell thereto).

I.2.B. Cell Addition/Deletion Operation Example: FIGS. 7-9, and 10A-10D

Figure 7:
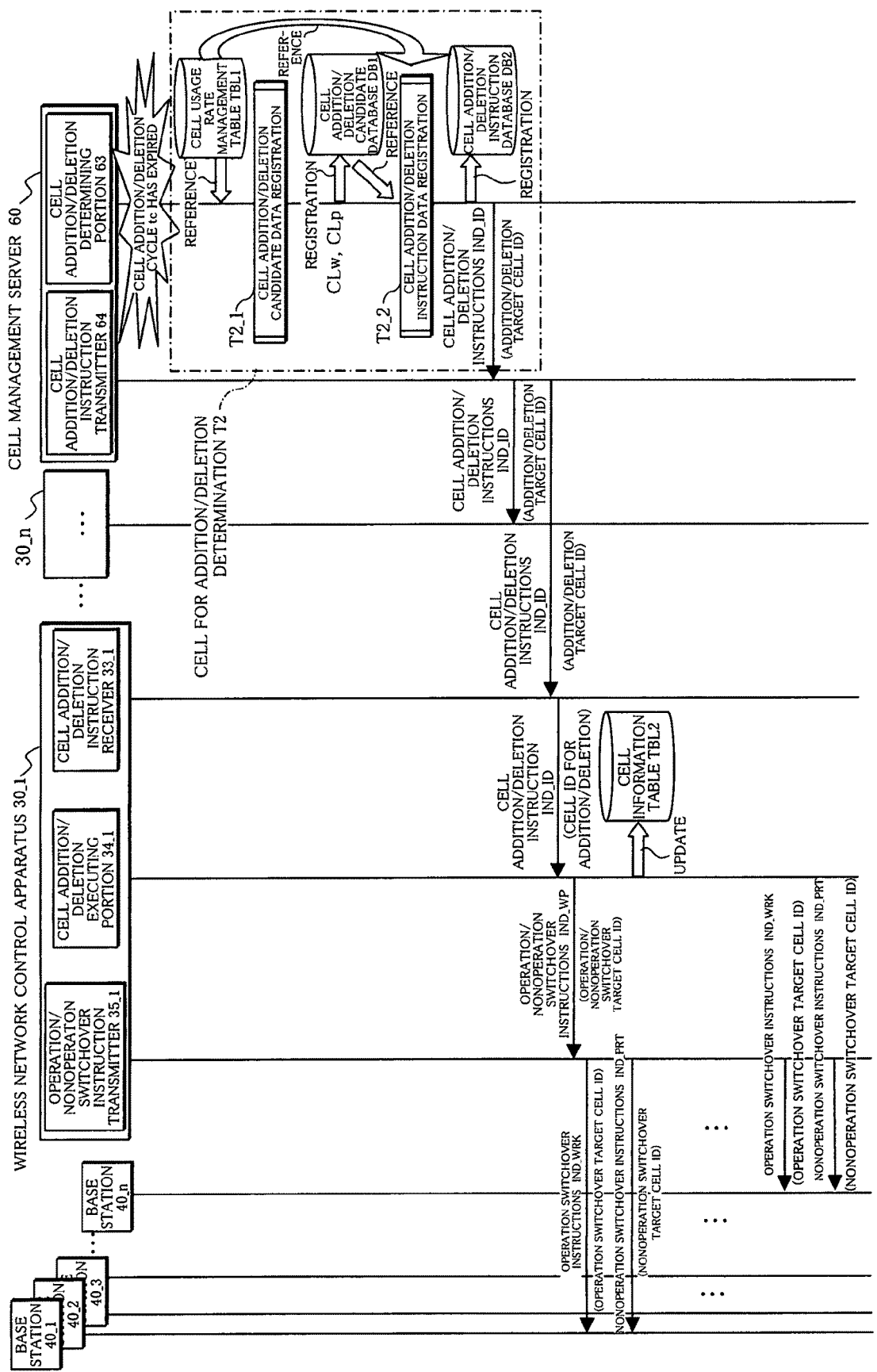
FIG. 7 is a sequence diagram showing a cell addition/deletion operation example common to embodiments of a cell management method and apparatus according to the present invention.

FIG. 7 is a sequence diagram showing an overall operation of cell addition/deletion by the cell management server 60 and the wireless network control apparatus 30.

The cell addition/deletion determining portion 63 in the cell management server 60 executes an addition/deletion target cell determination (at step T2) enclosed by dashed-dotted lines in FIG. 7 when the cell addition/deletion cycle "tc" (arbitrary cycle) has expired (or when the cell addition/deletion request REQ shown by dotted lines in FIG. 4 is received).

Namely, the cell addition/deletion determining portion 63 executes the cell addition/deletion candidate data registration (at step T2_1) which will be described later referring to the cell usage rate management table TBL1, and registers the nonoperating cells CLp rendered the addition candidate and the operating cells CLw rendered the deletion candidate in the cell addition/deletion candidate database DB1.

The cell addition/deletion determining portion 63 executes the cell addition/deletion instruction data registration (at step T2_2) referring to the cell addition/deletion candidate database DB1 and the cell usage rate management table TBL1, and registers the cells CL in which the operating/nonoperating state should be switched over in the cell addition/deletion instruction database DB2.

Figure 8:
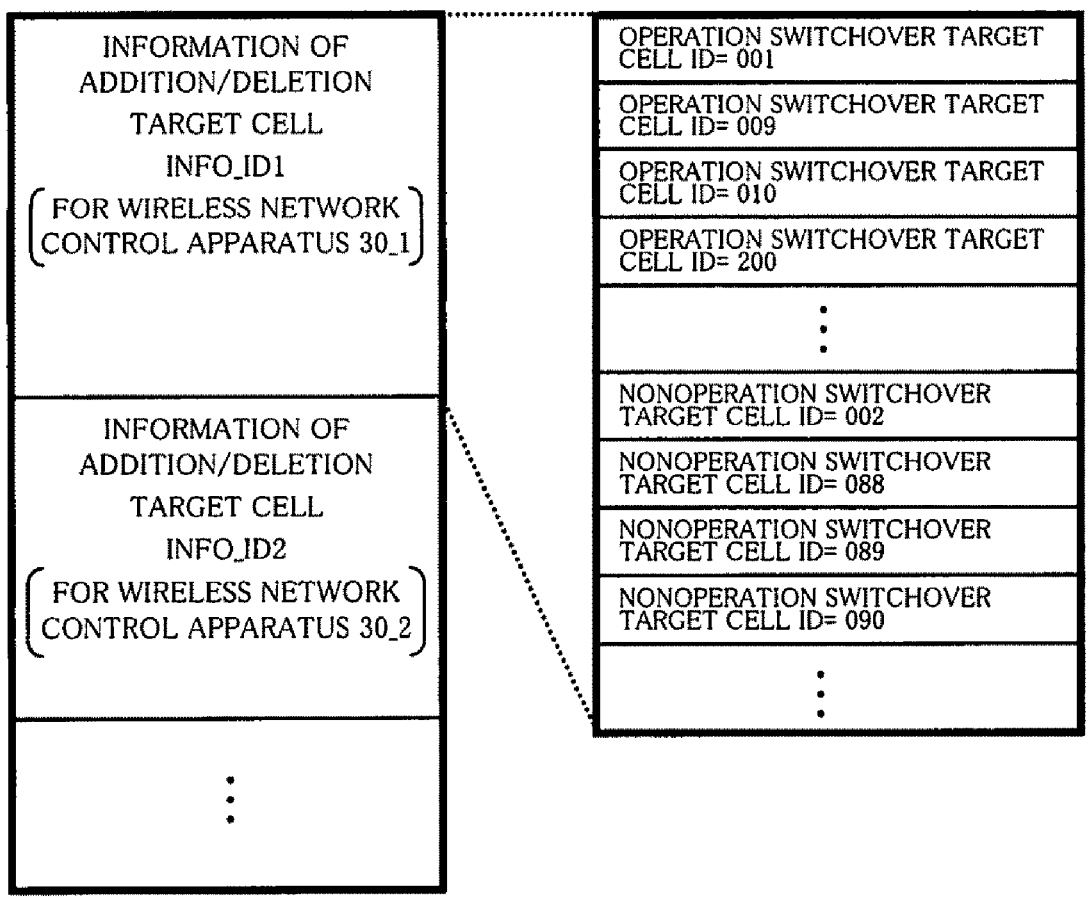
FIG. 8 is a diagram showing an embodiment of a cell addition/deletion instruction database used for the present invention.

As shown in FIG. 8, the cell addition/deletion instruction database DB2 is divided into addition/deletion target cell information INFO_ID1, 2, etc. (hereinafter, occasionally represented by reference characters INFO_ID) per wireless network control apparatus 30. In the addition/deletion target cell information INFO_ID, operation switchover (i.e. switchover to operating state) target cell ID's and nonoperation switchover (i.e. switchover to nonoperating state) target cell ID's are respectively set.

The cell addition/deletion determining portion 63 provides the cell addition/deletion instruction transmitter 64 with cell addition/deletion instructions IND_ID (cell ID's to be added/deleted) corresponding to the cells CL registered in the cell addition/deletion instruction database DB2.

Upon receipt thereof, the cell addition/deletion instruction transmitter 64 transmits the cell addition/deletion instructions IND_ID to the wireless network control apparatus 30.

Upon receipt thereof, in the wireless network control apparatus 30_1, for example, the cell addition/deletion instruction 33_1 in the apparatus itself provides the cell addition/deletion executing portion 34_1 with the cell addition/deletion instructions IND_ID received.

Upon receipt thereof, the cell addition/deletion executing portion 34_1 provides the operation/nonoperation switchover instruction transmitter 35_1 with the corresponding operation/nonoperation switchover instructions IND_WP (operation/nonoperation switchover target cell ID's) according to the instructions IND_ID, and updates (adds or deletes) the cell information related to the cells CL in the cell information table TBL2.

Figure 9:
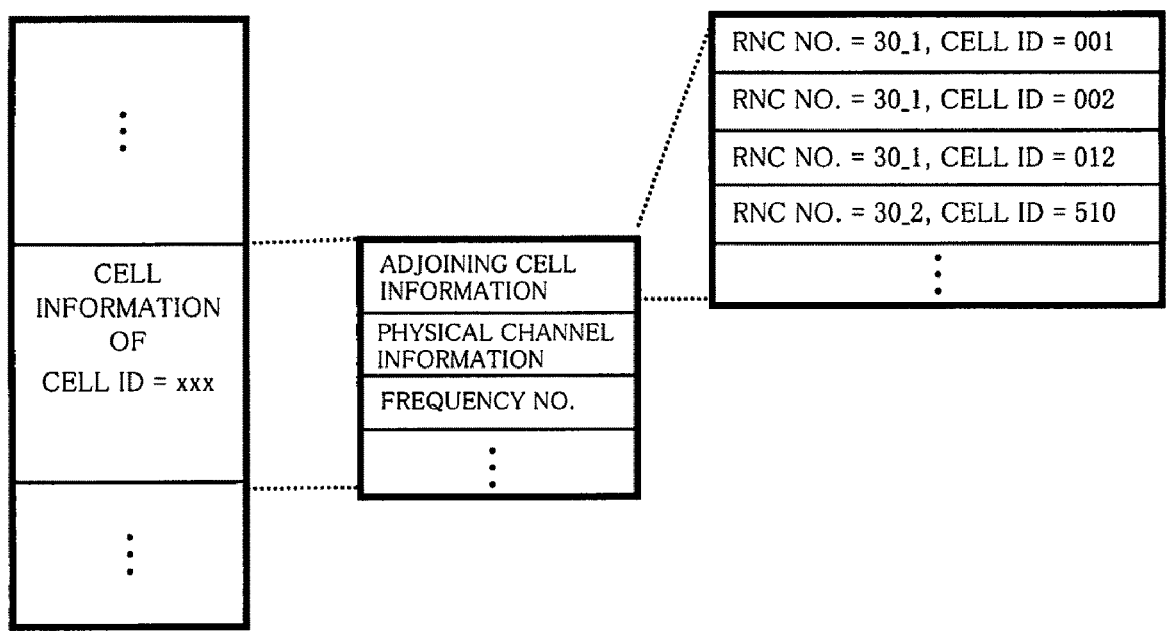
FIG. 9 is a diagram showing an embodiment of a cell information table used for the present invention.

For the cell information in the cell information table TBL2, as shown in FIG. 9, adjoining cell information including other adjoining cell ID's under the control of the apparatus 30 itself and adjoining cell ID's under the control of peripheral wireless network control apparatuses as well as physical channel information and the frequency No. allocated to the cells thereof are respectively set for an arbitrary cell ID "xxx" in the same way as the prior art example. For example, when a handover request (not shown) from the mobile station 40 is received, the wireless network control apparatus 30 controls the handover based on the cell information table TBL2.

The operation/nonoperation switchover instruction transmitter 35_1 transmits operation switchover instructions IND_WRK (cell ID's to be switched over to operating state) and nonoperation switchover instructions IND_PRT (cell ID's to be switched over to nonoperating state) to the base stations 40_1-40_3 connected to the apparatus itself.

Upon receipt thereof, the base stations 40_1-40_3 can perform addition/deletion of cells as shown in FIGS. 10A-10D.

It is now assumed that, as shown in FIG. 10A, the base station 40_1 turns the powers of antennas ANT2, ANT4, and ANT5 (hereinafter, occasionally represented by a reference character ANT) "ON", and the power of antennas ANT1, ANT9, and ANT10 "OFF". Namely, the cells CL_002, CL_004, and CL_005 are set to the operating state and the cells CL_001, CL_009, and CL_010 are set to the nonoperating state.

In this case, when the cell ID's "001", "009", and "010" for switchover to the operating state and the cell ID "002" for switchover to the nonoperating state are instructed by the wireless network control apparatus 30_1, the base station 40_1 turns the power of the antennas ANT1, ANT9, and ANT10 "ON" to set the cells CL_001, CL_009, and CL_010 in the operating state and turns the power of antenna ANT2 "OFF" to set the cell CL_002 in the nonoperating state as shown in FIG. 10B, thereby performing the cell addition. The cell deletion is performed by having the base station 40_1 restore the original states of power supplies of the antenna ANT1, ANT2, ANT9, and ANT10.

Also, as shown in FIG. 10C, it is assumed that the base station 40_1 is in an operating state and the base stations 40_2 and 40_3 are in inactive states. Namely, the cells CL_101-104 within the cover area AR1 of the base stations 40_1 is set in the operating state.

In this case, when the cell ID's "201"-"204" and "301"-"304" for switchover to the operating state and the cell ID's "101"-"104" for switchover to the nonoperating state are instructed by the wireless network control apparatus 30_1, the base station 40_1 turns itself to the inactive state and sets the cells CL_101-104 to the nonoperating state, as shown in FIG. 10D.

Also at the same time, the base stations 40_2 and 40_3 respectively turn themselves to the active state and perform the cell addition by setting the cells CL_201-204 and cells CL_301-CL_304 in the operating state. The cell deletion is performed by having the base stations 40_1-40_3 restore their original active state.

II. Embodiments of Addition/Deletion Target Cell Determination: FIGS. 11A, 11B, 12-16, 17A and 17B Hereinafter, embodiments [1]-[3] of an addition/deletion target cell determination will be described respectively referring to FIGS. 11A, 11B, and 12, FIGS. 13-15, as well as FIGS. 16, 17A, and 17B.

Figure 11A:
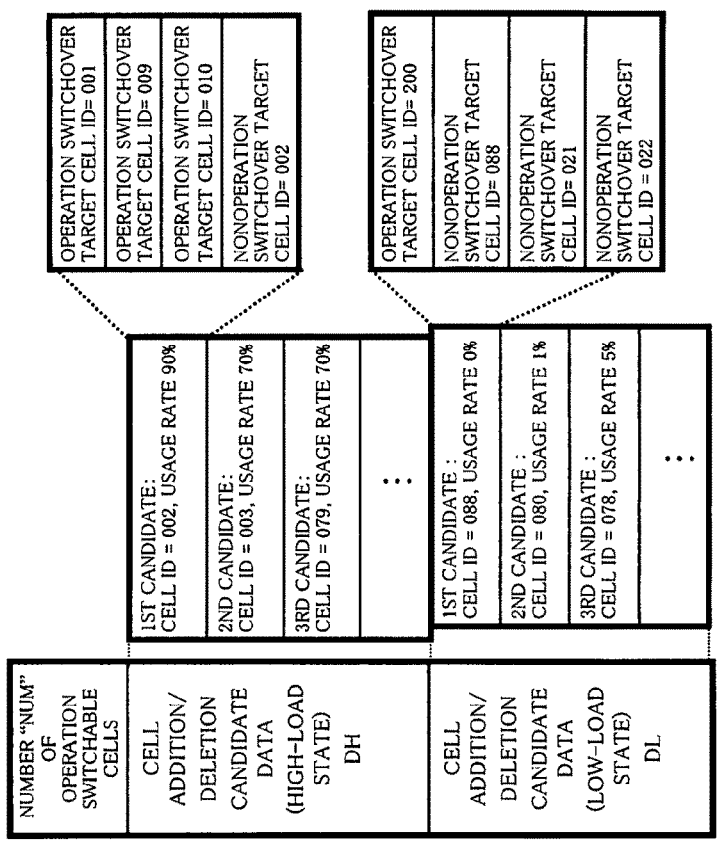
FIGS. 11A and 11B are diagrams showing a cell addition/deletion candidate data registration example in an embodiment [1] of a cell management method and apparatus according to the present invention.
Figure 11B:
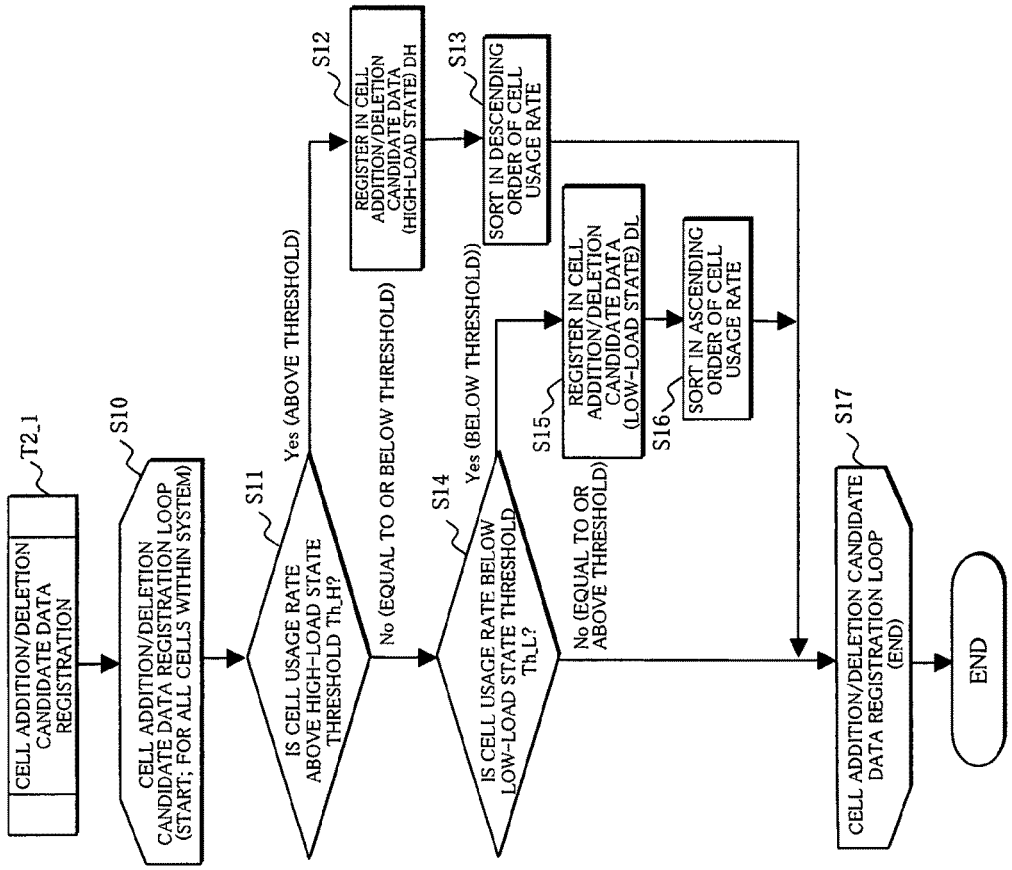
Figure 12:
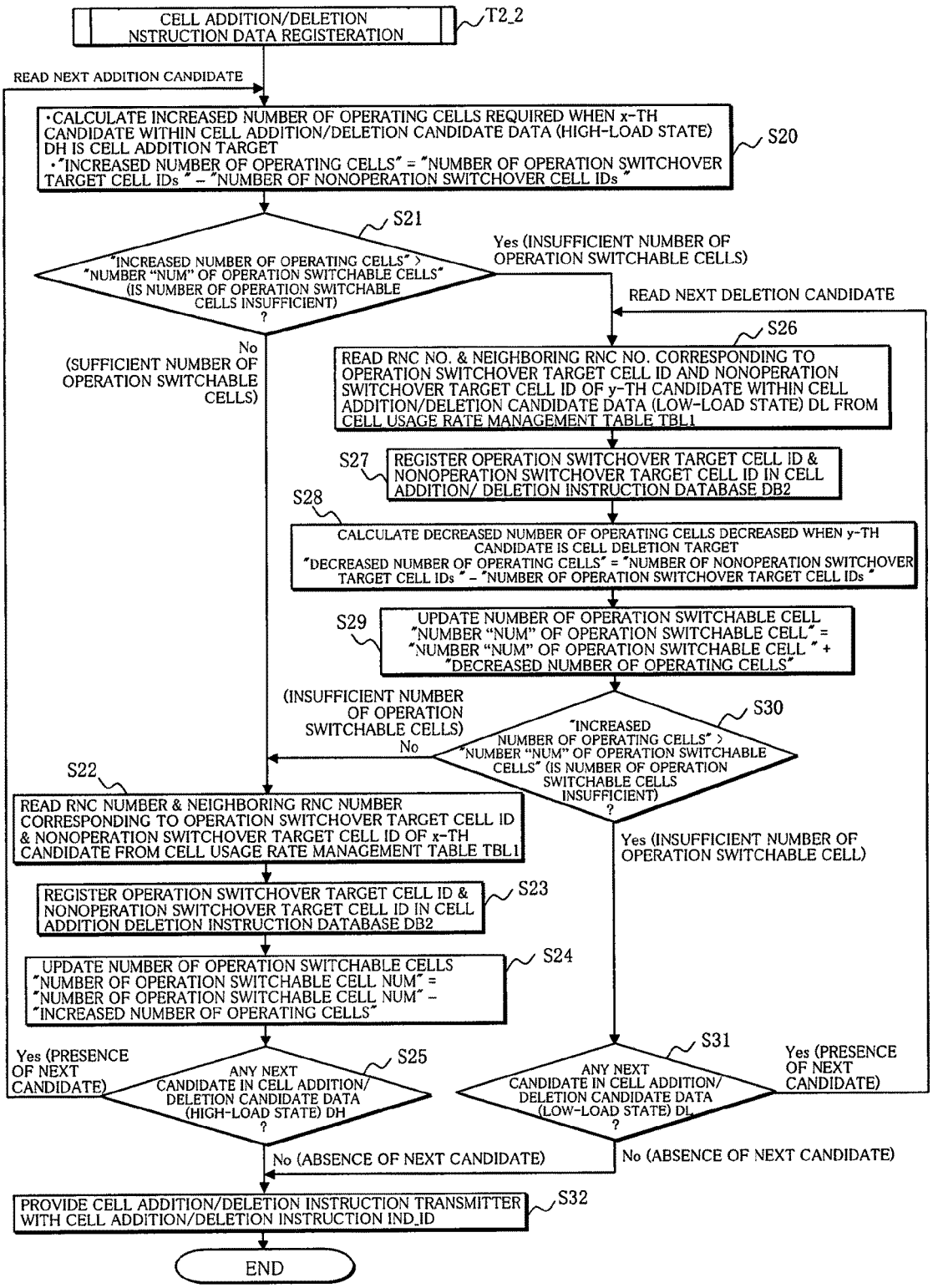
FIG. 12 is a flowchart showing a cell addition/deletion instruction data registration example in an embodiment [1] of a cell management method and apparatus according to the present invention.

II.1. Embodiment [1] of Addition/Deletion Target Cell Determination: FIGS. 11A, 11B, and 12

This embodiment performs a cell addition/deletion candidate data registration example and a cell addition/deletion instruction data registration example according to the state of the cell usage rates.

II.1.A. Cell Addition/Deletion Candidate Data Registration Example: FIGS. 11A and 11B As shown in FIG. 11A, the cell addition/deletion determining portion 63 sequentially refers to all of the cells CL within the wireless communication system 1 (namely, records corresponding to all cell ID's in the cell usage rate management table TBL1 shown in FIG. 6B) (at step S10).

Upon determining that the cell usage rate of a cell CL referred is above the high-load state threshold Th_H (at step S11), the cell addition/deletion determining portion 63 refers to cell ID's of the addition candidate and the deletion candidate at the time of high-load state corresponding to the cell CL from the cell usage rate management table TBL1, and makes these cell ID's respectively the operation switchover target cell ID's and the nonoperation switchover target cell ID's to be registered as cell addition/deletion candidate data (high-load state) DH within the cell addition/deletion candidate database DB1 shown in FIG. 11B (at step S12).

Assuming now that, for example, the high-load state threshold Th_H is set to "70%", in the cell addition/deletion candidate data (high-load state) DH as shown in FIG. 11B, the cell ID's of the addition candidate and the cell ID's of the deletion candidate corresponding to the cell ID's "002" (cell usage rate "90%"), "003" (cell usage rate "70%"), and "079" (cell usage rate "70%") in the cell usage rate management table TBL1 of FIG. 6B are registered respectively as the operation switchover target cell ID's and the nonoperation switchover target cell ID's.

The cell addition/deletion determining portion 63 sorts the cell addition/deletion candidate data (high-load state) DH in descending order of the cell usage rate every time the cell addition/deletion candidate data (high-load state) DH is registered (at step S13). This is for having the candidate with higher cell usage rate preferentially referred in the cell addition/deletion instruction data registration.

Therefore, as shown in FIG. 11B, the cell addition/deletion candidate data (high-load state) DH sequentially includes, from the first candidate, the operation switchover and the nonoperation switchover target cell ID's corresponding to the cell ID "002", the operation switchover and the nonoperation switchover target cell ID's corresponding to the cell ID "003", etc.

Also, upon determining that the cell usage rate of a cell CL referred is below the low-load state threshold Th_L (at step S14), the cell addition/deletion determining portion 63 makes the cell ID's of the addition candidate and the cell ID's of the deletion candidate at the time of the low-load state from the cell usage rate management table TBL1 respectively the operation switchover target cell ID's and the nonoperation switchover target cell ID's to be registered as cell addition/deletion candidate data (low-load state) DL shown in FIG. 11B (at step S15).

Assuming now that for example the low-load state threshold Th_L is set to "5%", in the cell addition/deletion candidate data (low-load state) DL as shown in FIG. 11B, cell ID's of the addition candidate and the cell ID's of the deletion candidate corresponding to the cell ID's "078" (cell usage rate "5%"), "080" (cell usage rate "1%"), and "088" (cell usage rate "0%") in the cell usage rate management table TBL1 of FIG. 6B are registered respectively as the operation switchover target cell ID's and the nonoperation switchover target cell ID's.

The cell addition/deletion determining portion 63 sorts the cell addition/deletion candidate data (low-load state) DL in ascending order of the cell usage rate every time the cell addition/deletion candidate data (low-load state) DL is registered (at step S16). This is for having the candidate with lower cell usage rate preferentially referred in the cell addition/deletion instruction data registration.

Therefore, as shown in FIG. 1B, the cell addition/deletion candidate data (low-load state) DL includes sequentially, from the first candidate, the operation switchover and the nonoperation switchover target cell ID's corresponding to the cell ID "088", the operation switchover and the nonoperation switchover target cell ID's corresponding to the cell ID "078", etc.

It is to be noted that a number NUM of operation switchable cells (i.e. cells switchable to operating state) shown in FIG. 11B is a variable indicating how many remaining cells CL for the upper limit operating cell can be set in the operating state (namely, how many candidates from the cell addition/deletion candidate database DB1 can be made the addition/deletion target cells), and is updated every time the cell CL for the addition/deletion is determined in the cell addition/deletion data registration.

II.1.B. Cell Addition/Deletion Instruction Data Registration Example: FIG. 12

As shown in FIG. 12, the cell addition/deletion determining portion 63 sequentially refers to the cell addition/deletion candidate data (high-load state) DH shown in FIG. 11B from the first candidate.

The cell addition/deletion determining portion 63 calculates an "increased number of operating cells" required at the time of making a "x-th" candidate being referred the cell addition target according to the following equation (1) (at step S20):

"Increased number of operating cells"="Number of operation switchover target cell ID's"−"Number of nonoperation switchover target cell ID's"  Eq. (1)

For example, when the first candidate in the cell addition/deletion candidate data (high-load state) DH is being referred, "number of operation switchover target cell ID's" is "3" and "number of nonoperation switchover target cell ID's" is "1", so that the calculated "increased number of operating cells" is "2" (="3"−"1").

Hereinafter, steps S21-S25 shown in FIG. 12 will be described, taking the first candidate of the cell addition/deletion candidate data (high-load state) DH as an example.

If the "number NUM of operation switchable cells" in the cell addition/deletion candidate database DB1 is e.g. "3", "increased number of operating cells<number NUM of operation switchable cells" is given, so that the cell addition/deletion determining portion 63 determines that the "number NUM of operation switchable cells" is sufficient (at step S21).

At this time, in order to find the wireless network control apparatus to which the operation switchovers of the operation switchover target cell ID's "001", "009", and "010" as well as the nonoperation switchover of the nonoperation switchover target cell ID "002" of the cell CL_002 in the first candidate of the cell addition/deletion candidate data (high-load state) DH should be notified, the cell addition/deletion determining portion 63 reads the RNC No. "30_1" and the neighboring RNC Nos. "30_2" and "30_3" corresponding to these cell ID's from the cell usage rate management table TBL1 shown in FIG. 6B (at step S22).

Then, the cell addition/deletion determining portion 63 respectively registers the operation switchover target cell ID's "001", "009", and "010" as well as the nonoperation switchover target cell ID "002" in the addition/deletion target cell information INFO_ID1-INFO_ID3 (see the cell addition/deletion instruction database DB2 of FIG. 8) for the wireless network control apparatuses 30_1-30_3 corresponding to the RNC No. and the peripheral RNC Nos. read (at step S23).

The cell addition/deletion determining portion 63 updates the "number NUM of operation switchable cells" according to the following equation (2) (at step S24):

"Number NUM of operation switchable cells"="Number NUM of operation switchable cells"−"Increased number of operating cells"   Eq. (2)

Since "number NUM of operation switchable cells" is now "3" and the "increased number of operating cells" is "2", the updated "number NUM of operation switchable cells" is calculated as "1".

The cell addition/deletion determining portion 63 determines whether or not a subsequent candidate exists in the cell addition/deletion candidate data (high-load state) DH (at step S25). Since the candidates of second and beyond exist in the cell addition/deletion candidate data (high-load state) DH shown in FIG. 11B, the cell addition/deletion determining portion 63 reads the subsequent candidate (namely, the second candidate) and repeatedly executes the above mentioned steps S20-S25.

On the other hand, if the "number NUM of operation switchable cells" is e.g. "1" at step S21, "increased number of operating cells>number NUM of operation switchable cells" is given, so that the cell addition/deletion determining portion 63 determines that the "number NUM of operation switchable cells" is sufficient, and sequentially refers to the cell addition/deletion candidate data (low-load state) DL shown in FIG. 11B from the first candidate.

Hereinafter, steps S26-S31 shown in FIG. 12 will be described, taking the first candidate of the cell addition/deletion candidate data (low-load state) DL as an example.

In the same way as the above-mentioned step S22, in order to find the wireless network control apparatuses to which the operation/nonoperation switchover of the cells CL should be notified, the cell addition/deletion determining portion 63 reads the RNC No. "30_1" and the peripheral RNC No. "none" corresponding to the operation switchover target cell ID "200" as well as the nonoperation switchovers of the nonoperation switchover target cell ID's "088", "089", and "090" in the first candidate of the cell addition/deletion candidate data (low-load state) DL (at step S26).

Then, the cell addition/deletion determining portion 63 respectively registers the operation switchover target cell ID "200" as well as the nonoperation switchover target cell ID's "088", "089", and "090" in the addition/deletion target cell information INFO_ID1 for the wireless network control apparatus 30_1 in the cell addition/deletion instruction database DB2 (at step S27).

The cell addition/deletion determining portion 63 calculates a "decreased number of operating cells" that decreases when the first candidate is referred, according to the following equation (3) (at step S28):

"Decreased number of operating cells"="Number of nonoperation switchover target cell ID's"−"Number of operation switchover target cell ID's"   Eq. (3)

Since the "number of operation switchover target cell ID's" is "1" and the "number of nonoperation switchover target cell ID's" is "3", the "decreased number of operating cells" is calculated as "2".

The cell addition/deletion determining portion 63 updates the "number NUM of operation switchable cells" according to the following equation (4) (at step S29):

"Number NUM of operation switchable cells"="Number NUM of operation switchable cells"+"Decreased number of operating cells"   Eq. (4)

Since the "number NUM of operation switchable cells" is now "1" and the "increased number of operating cells" is "2", the updated "number NUM of operation switchable cells" is calculated as "3".

Accordingly, "increased number of operating cells<number NUM of operation switchable cells" is given, so that the cell addition/deletion determining portion 63 determines that the "number NUM of operation switchable cells" is sufficient (at step S30), and performs the above-mentioned steps S22-S25.

On the other hand, upon determining that the "number NUM of operation switchable cells" is still insufficient at the above-mentioned step S30, the cell addition/deletion determining portion 63 determines whether or not a subsequent candidate exists in the cell addition deletion candidate data (low-load state) DL (at step S31) in order to further decrease the number of operating cells (namely, in order to further increase the "number NUM of operation switchable cells" to make the above-mentioned steps S22-S25 executable). Since the candidates of second and beyond exist in the cell addition/deletion candidate data (low-load state) DL shown in FIG. 11B, the cell addition/deletion determining portion 63 reads the subsequent candidate (namely, the second candidate) and repeatedly executes the above-mentioned steps S26-S31.

Also, upon determining that a subsequent candidate does not exist at the above-mentioned step S25 or S31 (namely, when the registration of the cell addition/deletion instruction database DB2 is completed), the cell addition/deletion determining portion 63 provides the cell addition/deletion instruction transmitter 64 with the cell addition/deletion instructions IND_ID (cell ID's of addition/deletion targets) registered in the cell addition/deletion instruction database DB2 (at step S32).

Figure 13:
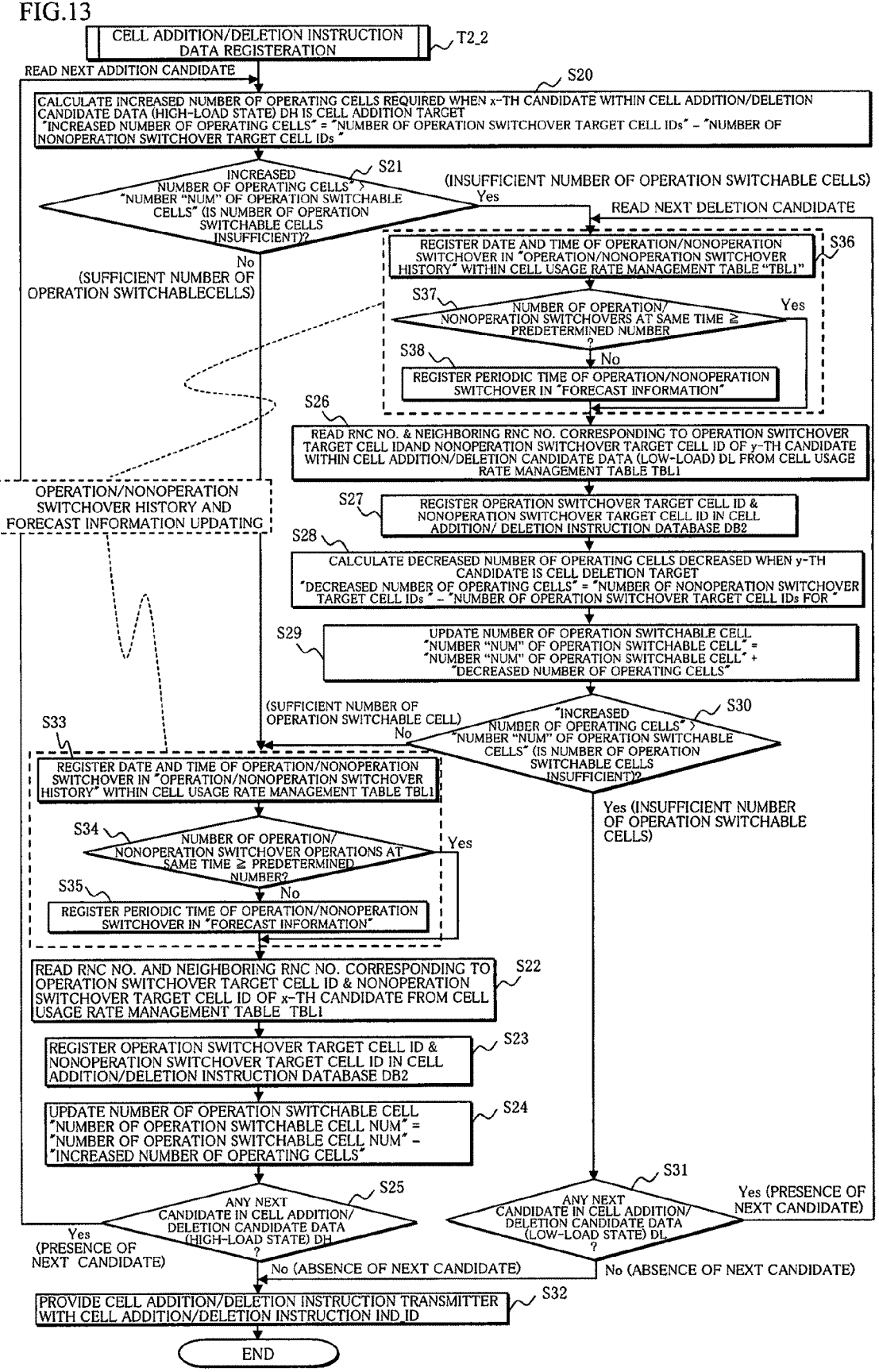
FIG. 13 is a flowchart showing a cell addition/deletion instruction data registration example in an embodiment [2] of a cell management method and apparatus according to the present invention.
Figure 15:
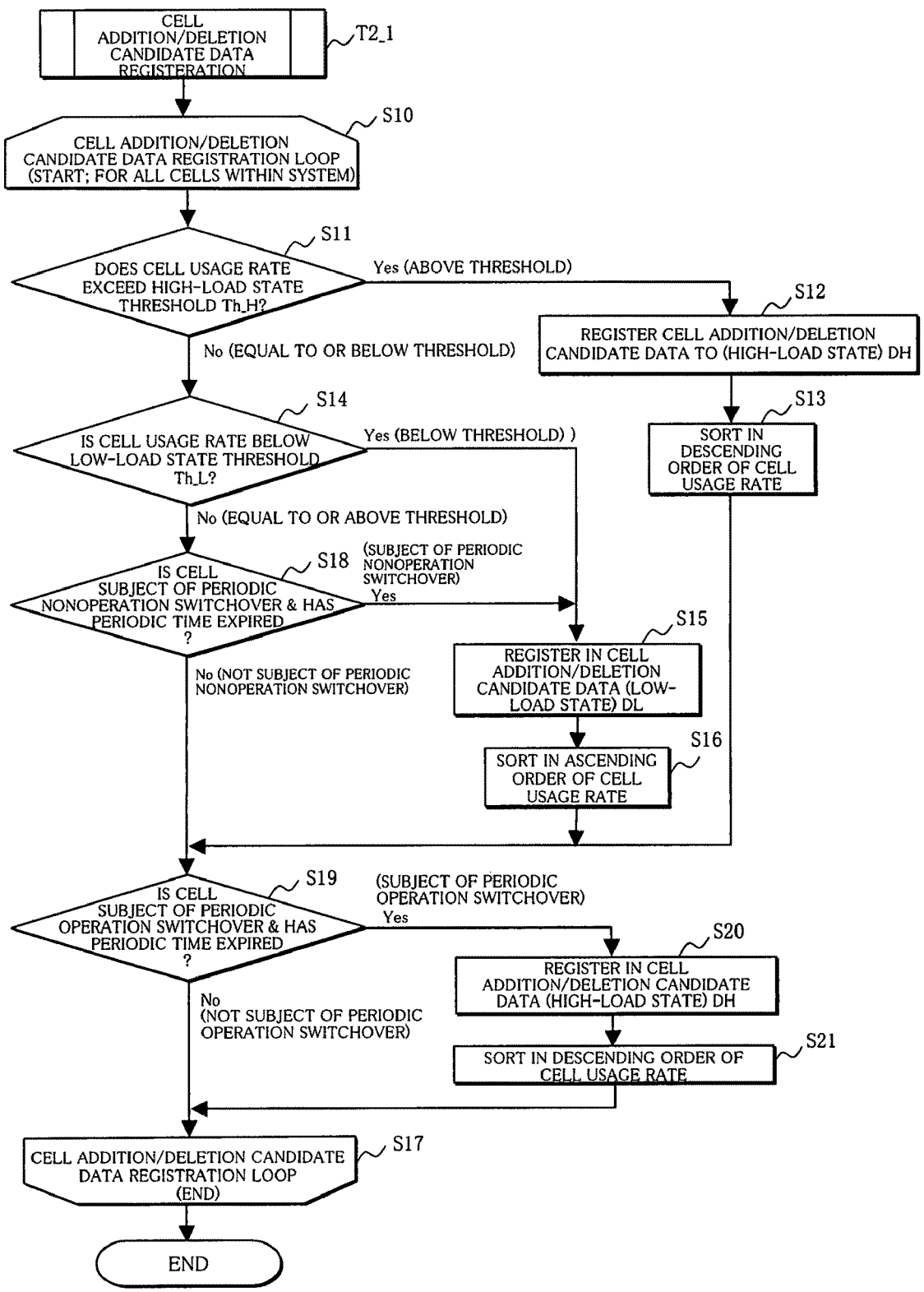
FIG. 15 is a diagram showing a cell addition/deletion candidate data registration example in an embodiment [2] of a cell management method and apparatus according to the present invention.

II.2. Embodiment [2] of Addition/Deletion Target Cell Determination: FIGS. 13-15

In this embodiment, the cell addition/deletion candidate data registration and the cell addition/deletion instruction data registration is executed based on a history and forecast information of the cell.

II.2.A Cell Addition/Deletion Instruction Data Registration Example: FIGS. 13 and 14

The cell addition/deletion instruction data registration shown in FIG. 13 includes an operation/nonoperation switchover history and forecast information updating (at steps S33-S38; however, the processes at steps S33-S35 and at steps S36-S38 are the same) enclosed by dotted lines in FIG. 13 in addition to the process flow shown in FIG. 12. In the cell usage rate management table TBL1 shown in FIG. 14, "operation/nonoperation switchover history" and "forecast information" are added to those shown in FIG. 6B.

Namely, every time an operation switchover target cell ID and a nonoperation switchover target cell ID are registered in the cell addition/deletion instruction database DB2, the cell addition/deletion determining portion 63 records (updates) the date and time of the operation/nonoperation switchover in an "operation/nonoperation switchover history" corresponding to the operation switchover target cell ID and the nonoperation switchover target cell ID (at step S33 or S36).

When operation switchovers or nonoperation switchovers are recorded equal to or more than a predetermined number of times (or days) in the updated "operation/nonoperation switchover history", (at step S34 or S37), the cell addition/ deletion determining portion 63 records (updates) a fixed time of the operation/nonoperation switchover in the "forecast information" (at step S35 or S38).

This will be described taking the cell CL_002 in FIG. 14 as an example. The operation switchovers and the nonoperation switchovers are recorded in the "operation/nonoperation switchover history" as respectively executed at "11:00" and "19:00" for 3 days between January 3rd to 5th of the year 2010. Therefore, the cell addition/deletion determining portion 63 records (updates) that the cell CL_002 requires the operation switchover to be executed every day at "11:00" and the nonoperation switchover to be executed every day at "19:00" in the "forecast information".

This "forecast information" is referred to at the time of the cell addition/deletion candidate data registration when the subsequent cell addition/deletion cycle "tc" (see FIG. 7) is reached (or upon receipt of the cell addition/deletion request REQ shown by a dotted line in FIG. 4).

II.2.B. Cell Addition/Deletion Candidate Data Registration Example: FIGS. 14 and 15

The cell addition/deletion candidate data registration shown in FIG. 15 includes steps S18-S21, where the processes at steps S20 and S21 are the same as those at steps S12 and S13, in addition to the process flow shown in FIG. 11A.

Namely, even when the cell usage rate shows neither the high-load state nor the low-load state (in medium-load state), the cell addition/deletion determining portion 63 refers to the "forecast information" corresponding to the referred cell CL from the cell usage rate management table TBL1 shown in FIG. 14, and upon determining that the cell is subject of a periodic nonoperation switchover and the periodic time is reached (at step S18), registers the cell ID of the cell CL in the cell addition/deletion candidate data (low-load state) DL (at steps S15 and S16) in the same way as the case where the cell usage rate is below the low-load state threshold Th_L.

Also, upon determining that the referred cell CL is the subject of the periodic operation switchover and the periodic time is reached (at step S19), the cell addition/deletion determining portion 63 registers the cell ID of the cell CL in the cell addition/deletion candidate data (high-load state) DH (at steps S20 and S21) in the same way as the case where the cell usage rate is above the high-load state threshold Th_H.

Figure 16:
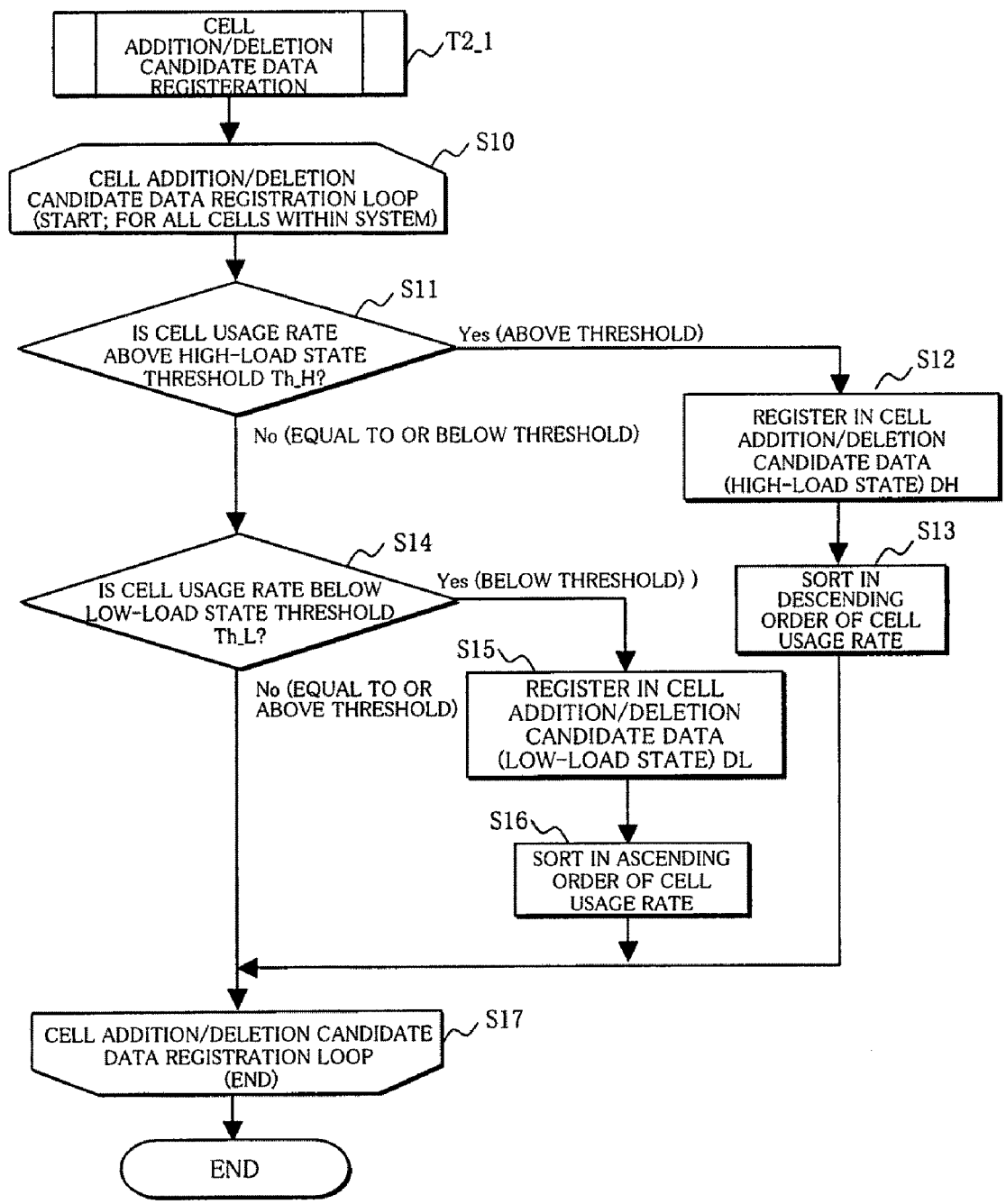
FIG. 16 is a flowchart showing a cell addition/deletion candidate data registration example in an embodiment [3] of a cell management method and apparatus according to the present invention.
Figures 17A, 17B:
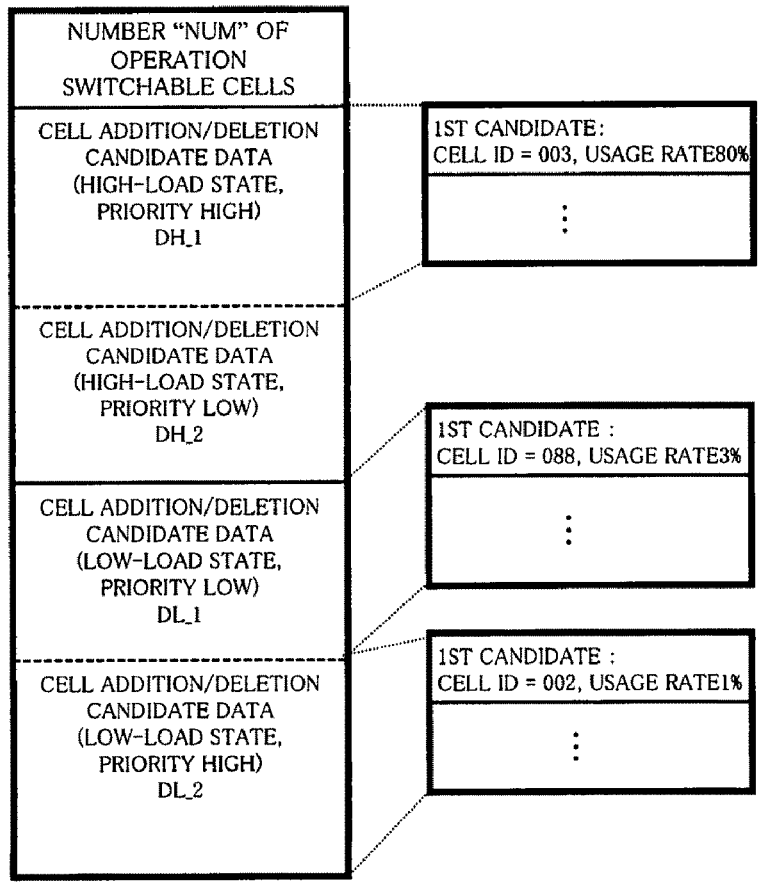
FIGS. 17A and 17B are diagrams showing embodiments of a cell usage rate management table and a cell addition/deletion candidate database used for an embodiment [3] of a cell management method and apparatus according to the present invention.
Figure 18:
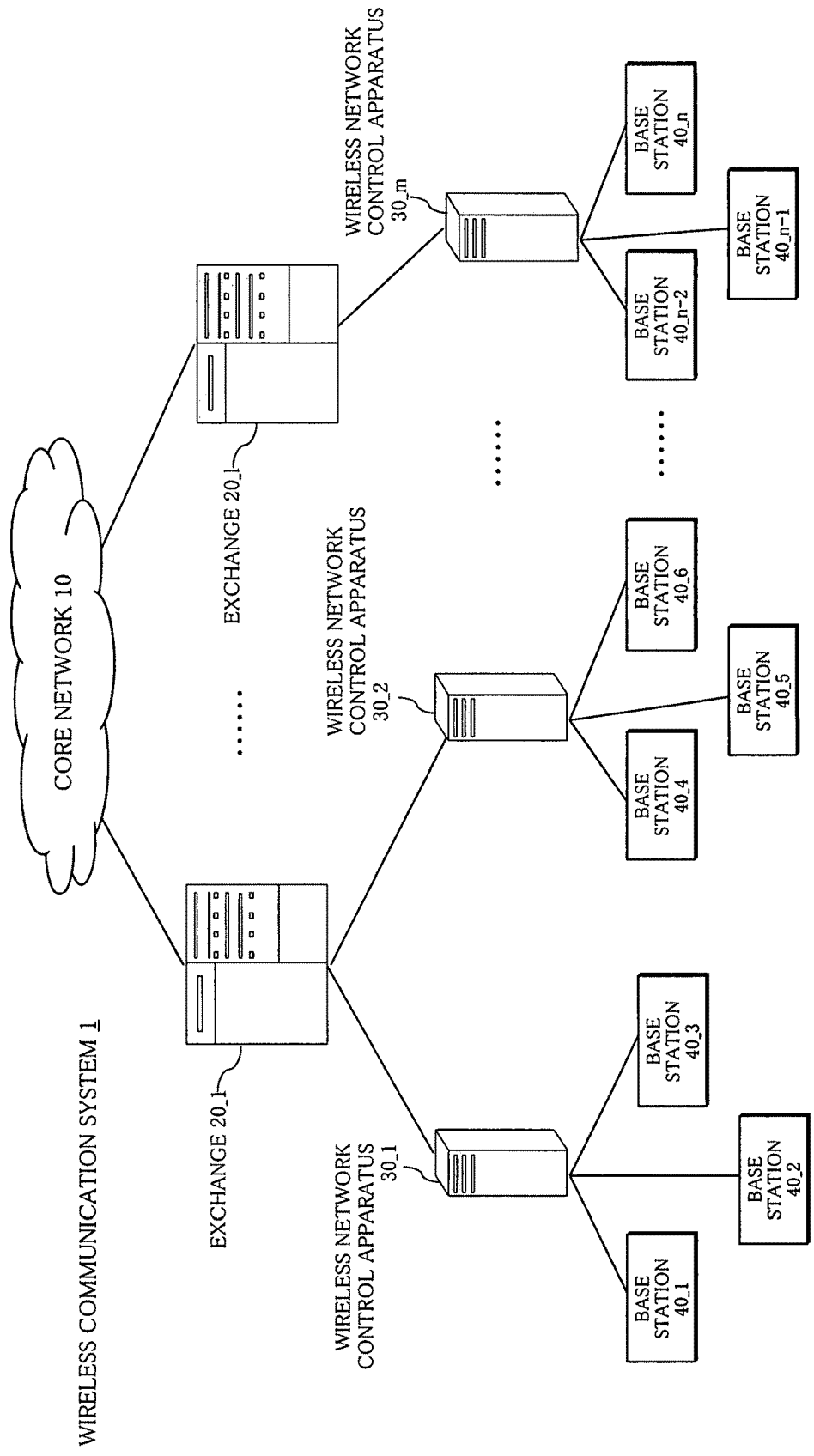
FIG. 18 is a block diagram showing an arrangement of a prior art wireless communication system.
Figure 19:
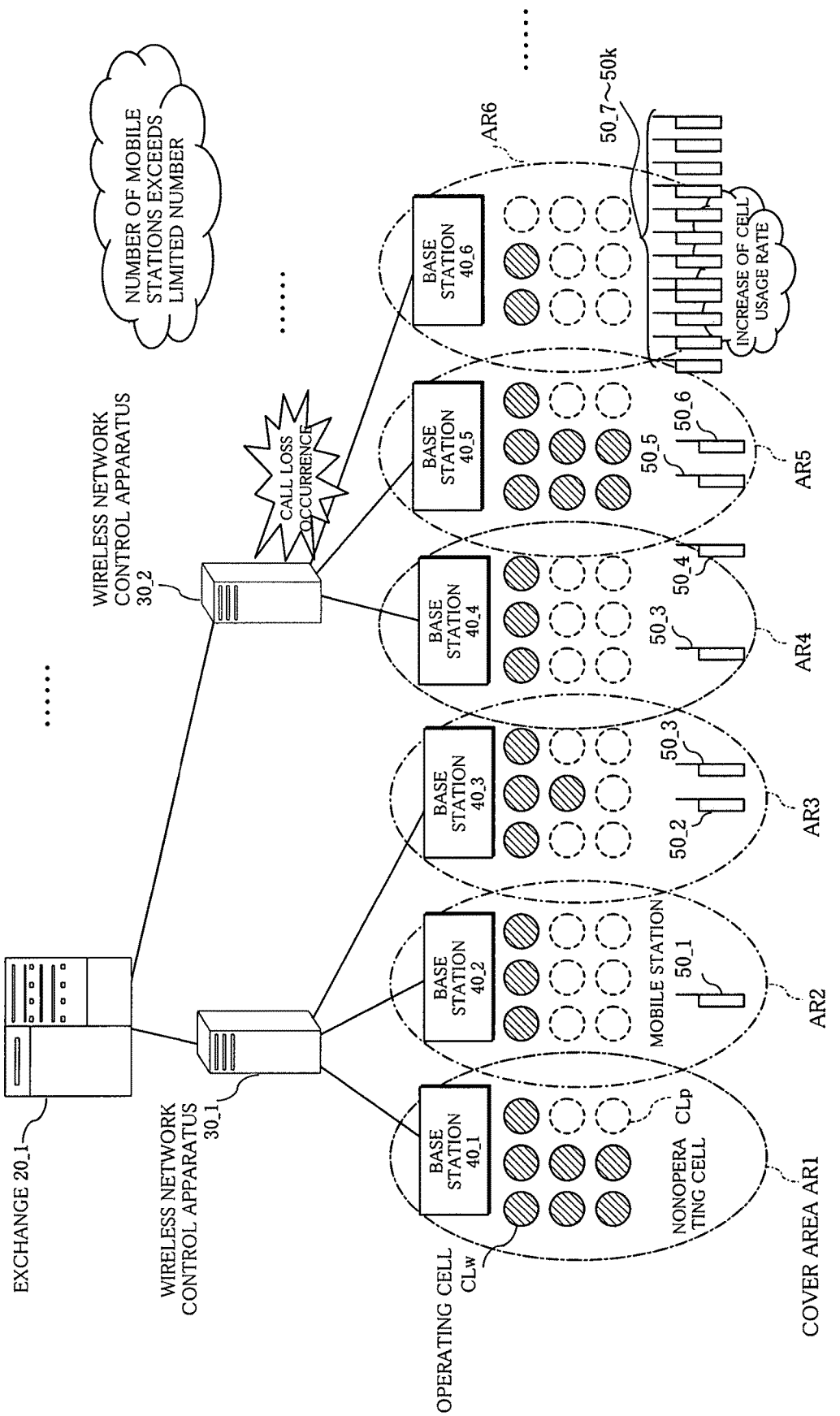
FIG. 19 is a block diagram showing an example of a conventional call loss occurrence.
Figure 21A:
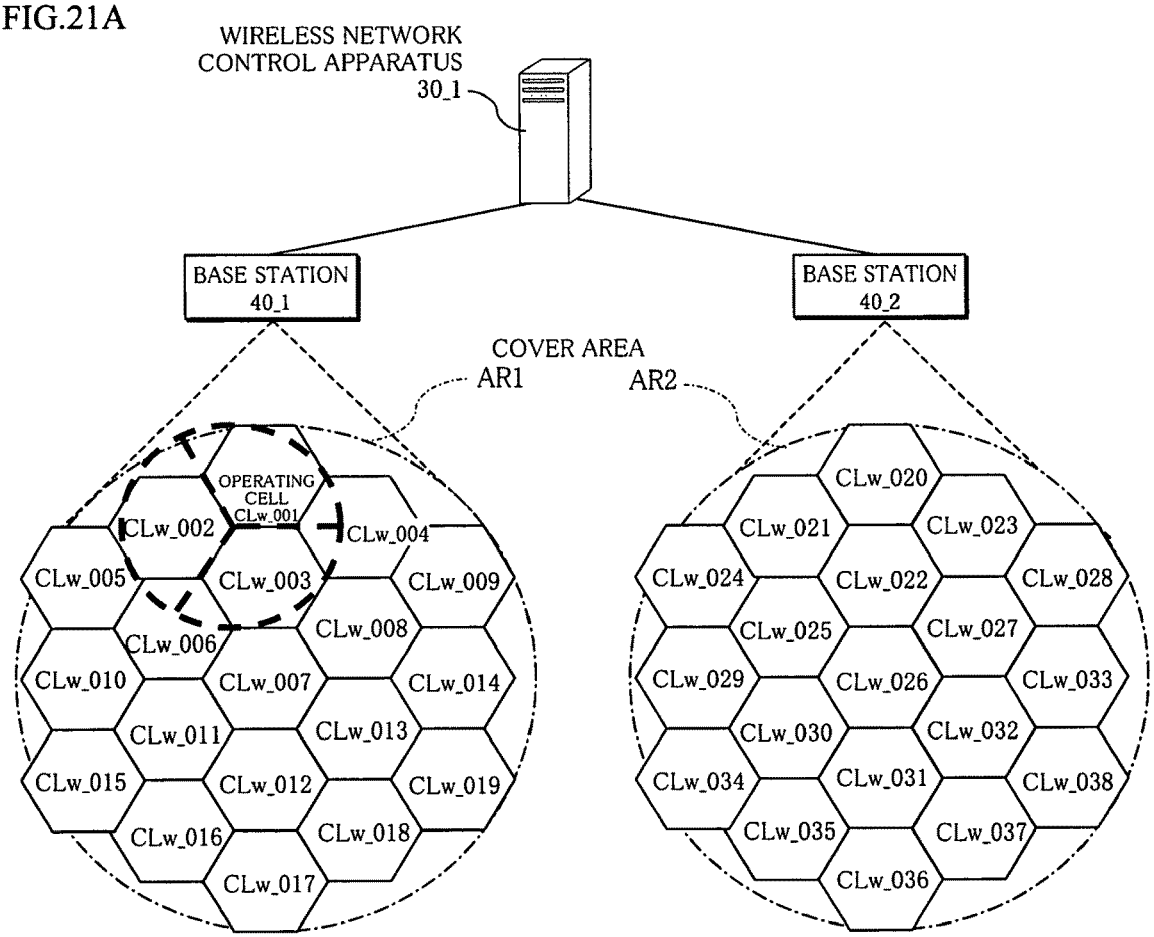
FIGS. 21A and 21B are block diagrams showing a prior art cell management example.
Figure 21B:
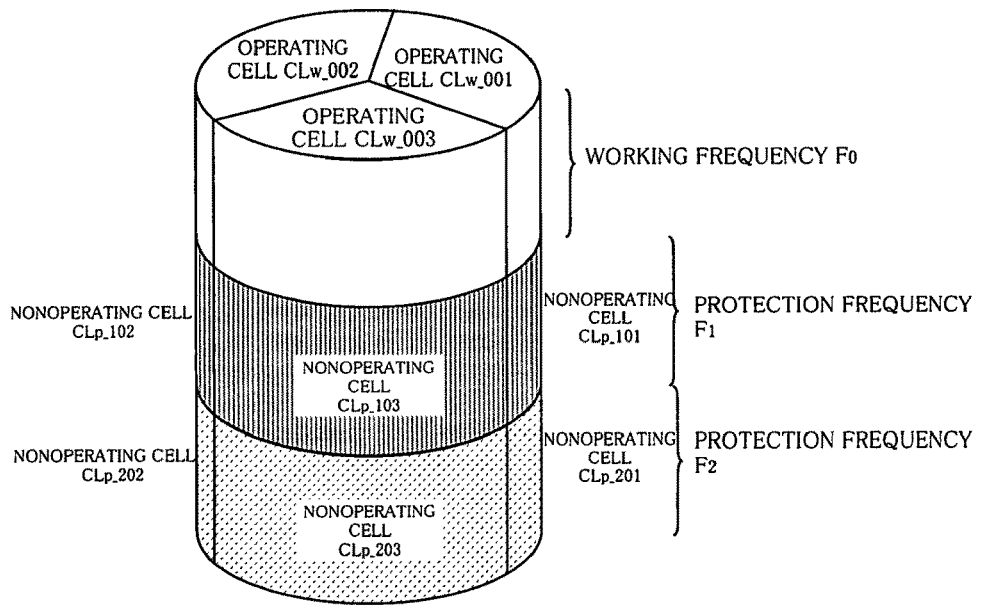

II.3. Embodiment [3] of Addition/Deletion Target Cell Determination: FIGS. 16, 17A, and 17B This embodiment performs the cell addition/deletion candidate data registration based on operation priority of the cell. It is to be noted that the cell addition/deletion instruction data registration is common to the above-mentioned embodiment [1].

II.3.A. Cell Addition/Deletion Candidate Data Registration Example: FIGS. 16 and 17

The cell addition/deletion candidate data registration shown in FIG. 16 is different from the process flow shown in FIG. 11A for the processes at steps S12 and S15. Also, in the cell usage rate management table TBL1 shown in FIG. 17A, the "operation priority" in addition to those shown in FIG. 6B is added. The cell addition/deletion candidate database DB1 shown in FIG. 17B is different from that shown in FIG. 11B in that the cell addition/deletion candidate data (high-load state) DH and the cell addition/deletion candidate data (low-load state) DL are respectively separated per "operation priority".

Upon determining that the cell usage rate of the referred cell CL is above the high-load state threshold Th_H at step S11, the cell addition/deletion determining portion 63 refers to the cell ID's of the addition candidate and the deletion candidate at the time of high-load state corresponding to the cell CL from the cell usage rate management table TBL1, and by referring to the "operation priority, registers the cell ID's as the operation switchover target cell ID's and nonoperation switchover corresponding to the operation priority in the cell addition/deletion candidate data (high-load state) DH (at step S12).

For example, in the case of the cell CL_003 in which the cell ID is "003" shown in FIG. 17A, the "operation priority" of the cell CL_003 indicating the high-load state (cell usage rate "80%") is set to "priority high", so that the operation switchover target cell ID's and nonoperation switchover related to the cells CL_003 is registered as the cell addition/ deletion candidate data (high-load state, high priority) DH_1 as shown in FIG. 17B.

The cell addition/deletion determining portion 63 sorts the cell addition/deletion candidate data (high-load state, high priority) DH in descending order of the cell usage rate every time the cell addition/deletion candidate data (high-load state, high priority) DH is registered (at step S13)

It is to be noted that also for the cell CL in which "operation priority" is "low", the cell addition/deletion candidate data (high-load state, low priority) DH_2 is registered in the same way as described above.

Also, upon determining that the cell usage rate of the referred cell CL is below the low-load state threshold Th_L at step S14, the cell addition/deletion determining portion 63 registers the operation switchover target cell ID's and the nonoperation switchover corresponding to the operation priority of the cell CL respectively in the cell addition/deletion candidate data (low-load state) DL, and sorts the cell addition/deletion candidate data (low-load state) DL in ascending order (at steps S15 and S16).

For example, the operation switchover target cell ID's and the nonoperation switchover target cell ID's for the cell CL_002 (cell usage rate "1%", "low priority") and the cell CL_088 (cell usage rate "3%", "high priority") shown in FIG.

17A are respectively registered, as shown in FIG. 17B, as the cell addition/deletion candidate data (low-load state, low priority) DL_1 and the cell addition/deletion candidate data (low-load state, high priority) DL_2 in the ascending order of the cell usage rate.

It is to be noted that the sequences of the operation priorities are reversed for the cell addition/deletion candidate data (high-load state) DH and the cell addition/deletion candidate data (low-load state) DL so that in the cell addition/deletion instruction data registration, the cell addition/deletion candidate data (high-load state) DH is preferentially referred from a candidate with a higher operation priority while the cell addition/deletion candidate data (low-load state) DL is preferentially referred from a candidate with a lower operation priority It is obvious that the present invention is not limited by the above-mentioned embodiments and that various modifications can be made by a man with ordinary skill in the art based on the recitation of the claims.

What is claimed is:

1. A cell management method comprising:
    a first step of acquiring a cell usage rate of at least one operating cell;
    a second step of allocating, when the acquired cell usage rate is in a high-load state, a narrower nonoperating cell, among the operating cell in the high-load state at a common frequency as an addition candidate and allocating the operating cell in the high-load state as a deletion candidate, or a second step of allocating, when the acquired cell usage rate is in a low-load state, a broader nonoperating cell, among the operating cell in the low-load state at the common frequency, as the addition candidate, another narrower operating cell belonging to the broader nonoperating cell as the deletion candidate, and the operating cell in the low-load state as the deletion candidate; and
    a third step of determining, from among the nonoperating cells of the addition candidate and the operating cells of the deletion candidate, a nonoperating cell to be switched over to the operating cell and an operating cell to be switched over to the nonoperating cell, within an upper limit number of operating cells.

2. The cell management method as claimed in claim 1, wherein the third step includes,
    a step of determining, from among the operating cells included in the deletion candidate and in the high-load state, an operating cell in which the cell usage rate is higher to be preferentially switched over to a nonoperating cell, and subsequently determining a narrower nonoperating cell to be switched over to an operating cell, and
    a step of determining, from among the operating cells included in the deletion candidate and in the high-load state, when a sum of an increased number of operating cells by the operating cells and the nonoperating cells determined and a number of operating cells before the determination exceeds the upper limit number of operating cells, an operating cell in which the cell usage rate is lower to be preferentially switched over to a nonoperating cell, and subsequently determining a broader nonoperating cell thereof to be switched over to an operating cell and another narrower operating cell belonging to the broader nonoperating cell to be switched over to a nonoperating cell so that the upper limit number of operating cells is not exceeded.

3. The cell management method as claimed in claim 1, wherein the third step includes a fourth step of updating a history of each cell, and determining a nonoperating cell as an addition candidate and an operating cell as a deletion candidate forecast based on the updated history, regardless of the cell usage rate.

4. The cell management method as claimed in claim 3, wherein the fourth step includes updating a date and time, as the history, when the nonoperating cell to be switched over to the operating cell and the operating cell to be switched over to the nonoperating cell are determined, and forecasting, when a switchover to an operating cell or a nonoperating cell of a same cell is recorded at a same time for a predetermined days or more, the cell as a periodic addition candidate or deletion candidate at the time.

5. The cell management method as claimed in claim 1, wherein an operation priority is assigned to every cell and the third step includes,
    a step of determining, from among the operating cells included in the deletion candidate and in the high-load state, an operating cell in which the operation priority is higher to be preferentially switched over to a nonoperating cell, and subsequently determining a narrower nonoperating cell to be switched over to an operating cell, and
    a step of determining, from among the operating cells included in the deletion candidate and in the high-load state, when a sum of an increased number of operating cells by the operating cells and the nonoperating cells determined and a number of operating cells before the determination exceeds the upper limit number of operating cells, an operating cell in which the operation priority is lower to be preferentially switched over to a nonoperating cell, and subsequently determining a broader nonoperating cell to be switched over to an operating cell and another narrower operating cell belonging to the broader nonoperating cell to be switched over to a nonoperating cell so that the upper limit number of operating cells is not exceeded.

6. A cell management apparatus comprising:
    a first means acquiring a cell usage rate of at least one operating cell;
    a second means allocating, when the acquired cell usage rate is in a high-load state, a narrower nonoperating cell among the operating cell in the high-load state at a common frequency, as an addition candidate and allocating the operating cell in the high-load state as a deletion candidate, or a second means allocating, when the acquired cell usage rate is in a low-load state, a broader nonoperating cell, among the operating cell in the low-load state at the common frequency, as the addition candidate, another narrower operating cell belonging to the broader nonoperating cell as the deletion candidate, and the operating cell in the low-load state as the deletion candidate; and
    a third means determining, from among the nonoperating cells of the addition candidate and the operating cells of the deletion candidate, a nonoperating cell to be switched over to the operating cell and an operating cell to be switched over to the nonoperating cell, within an upper limit number of operating cells.

7. The cell management apparatus as claimed in claim 6, wherein the third means includes,
    a means determining, from among the operating cells included in the deletion candidate and in the high-load state, an operating cell in which the cell usage rate is higher to be preferentially switched over to a nonoperating cell, and subsequently determining a narrower nonoperating cell to be switched over to an operating cell, and a means determining from among the operating cells included in the deletion candidate and in the high-load state, when a sum of an increased number of operating cells by the operating cells and the nonoperating cells determined and a number of operating cells before the determination exceeds the upper limit number of operating cells, an operating cell in which the cell usage rate is lower to be preferentially switched over to a nonoperating cell, and subsequently determining a broader nonoperating cell to be switched over to an operating cell and another narrower operating cell belonging to the broader nonoperating cell to be switched over to a nonoperating cell so that the upper limit number of operating cells is not exceeded.

8. The cell management apparatus as claimed in claim 6, wherein the third means includes a fourth means updating a history of each cell, and determining a nonoperating cell as an addition candidate and an operating cell as a deletion candidate forecast based on the updated history, regardless of the cell usage rate.

9. The cell management apparatus as claimed in claim 8, wherein the fourth means includes updating a date and time, as the history, when the nonoperating cell to be switched over to the operating cell and the operating cell to be switched over to the nonoperating cell are determined, and forecasting, when a switchover to an operating cell or a nonoperating cell of a same cell is recorded at a same time for a predetermined days or more, the cell as a periodic addition candidate or deletion candidate at the time.

10. The cell management apparatus as claimed in claim 6, wherein an operation priority is assigned to every cell and the third means includes, a means determining, from among the operating cells included in the deletion candidate and in the high-load state, an operating cell in which the operation priority is higher to be preferentially switched over to a nonoperating cell, and subsequently determining a narrower nonoperating cell to be switched over to an operating cell, and a means determining, from among the operating cells included in the deletion candidate and in the high-load state, when a sum of an increased number of operating cells by the operating cells and the nonoperating cells determined and a number of operating cells before the determination exceeds the upper limit number of operating cells, an operating cell in which the operation priority is lower to be preferentially switched over to a nonoperating cell, and subsequently determining a broader nonoperating cell to be switched over to an operating cell and another narrower operating cell belonging to the broader nonoperating cell to be switched over to a nonoperating cell so that the upper limit number of operating cells is not exceeded.

* * * * *